United States Patent
Uchida et al.

(10) Patent No.: US 7,359,291 B2
(45) Date of Patent: Apr. 15, 2008

(54) MAGNETO-OPTICAL STORAGE MEDIUM CAPABLE OF RECORDING PLURAL ROWS OF MARKS ON EACH TRACK

(75) Inventors: Akiyoshi Uchida, Kawasaki (JP); Masakazu Taguchi, Kawasaki (JP); Michio Matsuura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/912,391

(22) Filed: Aug. 5, 2004

(65) Prior Publication Data

US 2005/0007893 A1    Jan. 13, 2005

Related U.S. Application Data

(62) Division of application No. 10/460,803, filed on Jun. 11, 2003, now Pat. No. 6,801,479, which is a division of application No. 09/723,233, filed on Nov. 27, 2000, now Pat. No. 6,600,698.

(30) Foreign Application Priority Data

Dec. 3, 1999    (JP)    ................. 11-345499

(51) Int. Cl.
   *G11B 11/00* (2006.01)
(52) U.S. Cl. .................. 369/13.54; 369/13.55
(58) Field of Classification Search ........... None
   See application file for complete search history.

(56) References Cited

U.S. PATENT DOCUMENTS

| | | | |
|---|---|---|---|
| 4,473,829 A * | 9/1984 | Schouhamer Immink et al. ........ | 369/13.54 |
| 4,853,912 A | 8/1989 | Akasaka et al. ........ | 369/73 |
| 5,001,692 A * | 3/1991 | Farla et al. ........ | 369/47.51 |
| 5,093,822 A | 3/1992 | Kugiya et al. ........ | 369/121 |
| 5,357,493 A | 10/1994 | Okazaki et al. ........ | 369/13 |
| 5,400,313 A * | 3/1995 | Belser et al. ........ | 369/59.11 |
| 5,530,688 A | 6/1996 | Hurst, Jr. et al. ........ | 369/116 |
| 5,748,574 A | 5/1998 | Chao ........ | 369/13 |
| 6,101,154 A * | 8/2000 | Kim ........ | 369/13.24 |
| 6,111,823 A * | 8/2000 | Kim ........ | 369/13.24 |
| 6,115,330 A | 9/2000 | Morimoto ........ | 369/13 |
| 6,185,174 B1 * | 2/2001 | Belser ........ | 369/59.21 |
| 6,421,313 B1 * | 7/2002 | Belser ........ | 369/275.4 |
| 6,604,223 B1 | 8/2003 | Belser et al. ........ | 714/812 |
| 6,690,626 B2 * | 2/2004 | Birukawa et al. ........ | 369/13.55 |
| 6,754,141 B1 * | 6/2004 | Uchida et al. ........ | 369/13.54 |

FOREIGN PATENT DOCUMENTS

| | | |
|---|---|---|
| JP | 02179948 A | 7/1990 |
| JP | 05314491 A | 11/1993 |
| JP | 06044572 A | 2/1994 |

(Continued)

*Primary Examiner*—Tan Dinh
(74) *Attorney, Agent, or Firm*—Greer, Burns & Crain, Ltd.

(57) ABSTRACT

An optical disk recording method of recording data on an optical disk by applying laser light to a track of the optical disk, includes the steps of a) driving a plurality of laser light sources in sequence in a time division manner, and applying a light flux to one track of the optical disk successively, and b) producing a plurality of rows of record marks in the one track.

3 Claims, 24 Drawing Sheets

FOREIGN PATENT DOCUMENTS

| | | |
|---|---|---|
| JP | 06195744 A | 7/1994 |
| JP | 07244877 A | 9/1995 |
| JP | 07249244 A | 9/1995 |
| JP | 10069677 A | 3/1998 |
| JP | 11-25538 A | 1/1999 |

* cited by examiner

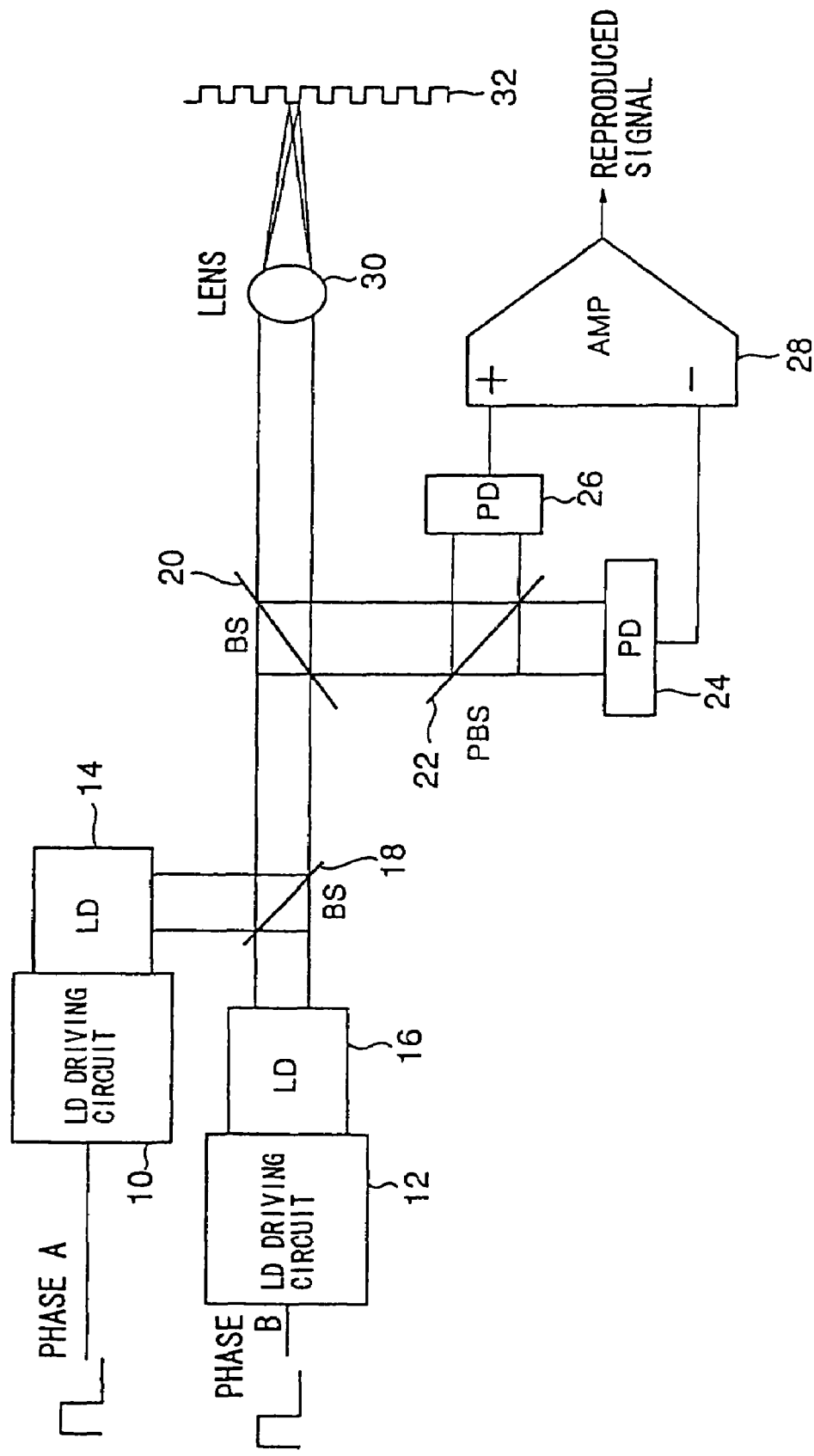

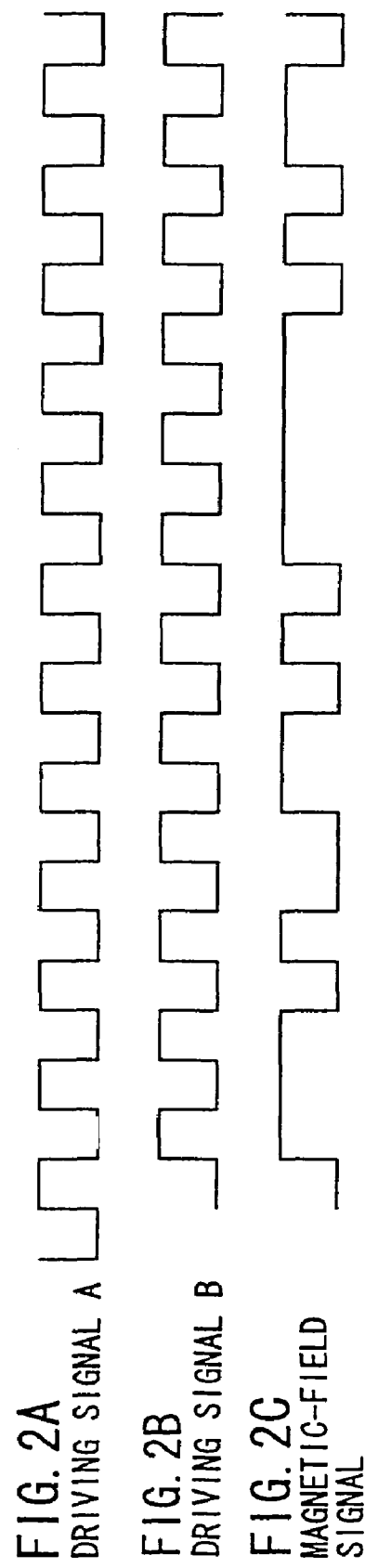
FIG. 2A DRIVING SIGNAL A
FIG. 2B DRIVING SIGNAL B
FIG. 2C MAGNETIC-FIELD SIGNAL

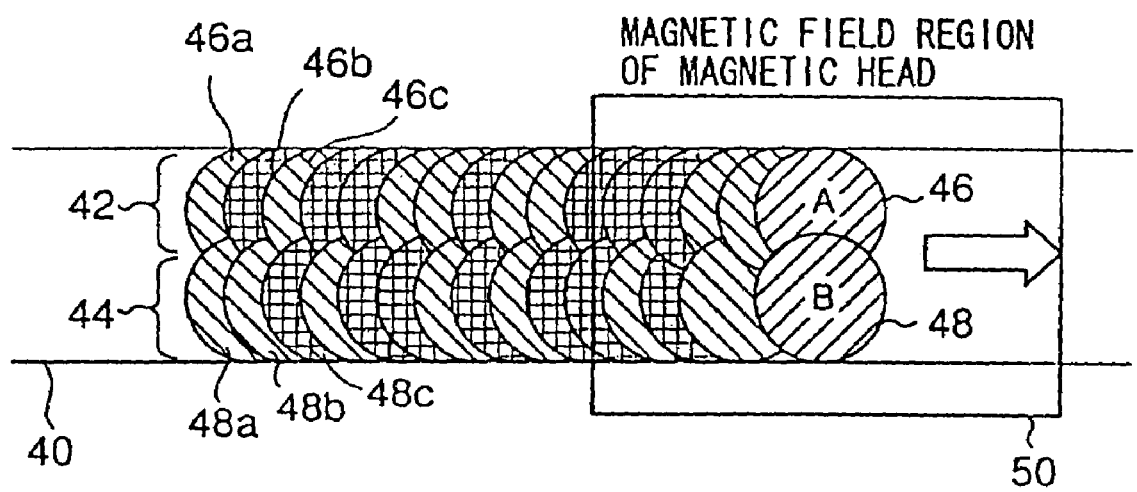

200   202

210   212

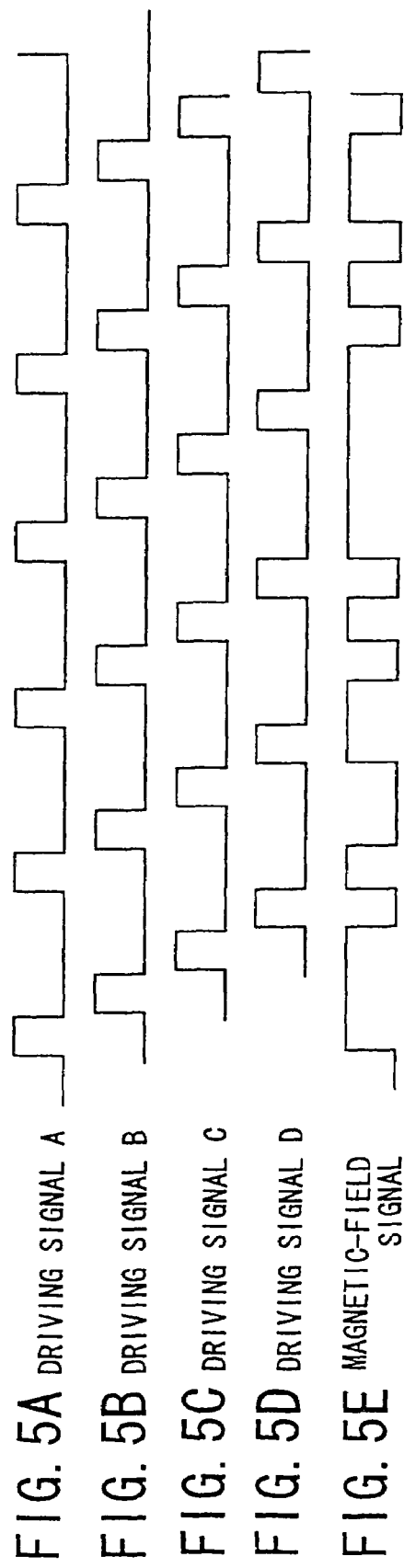

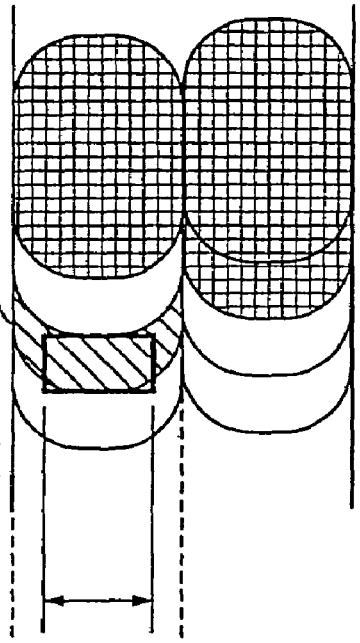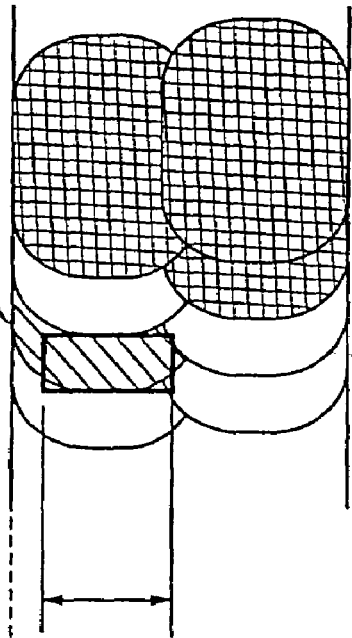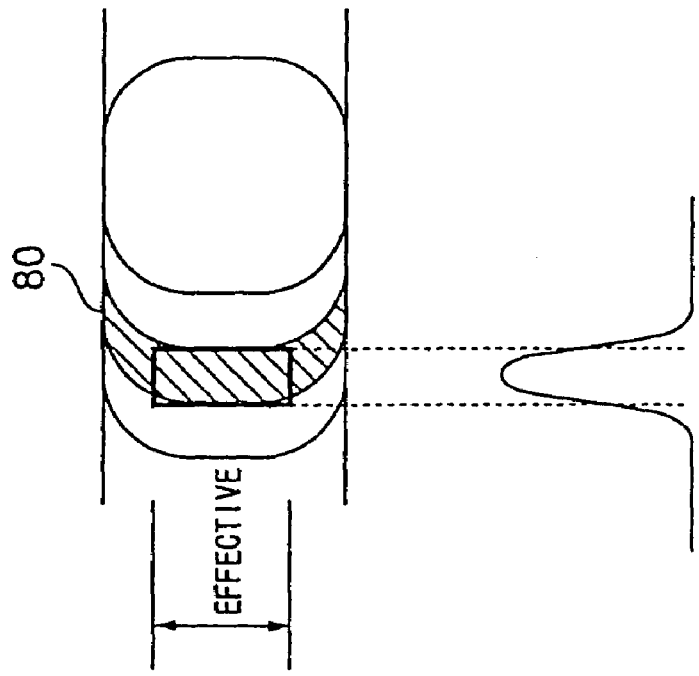

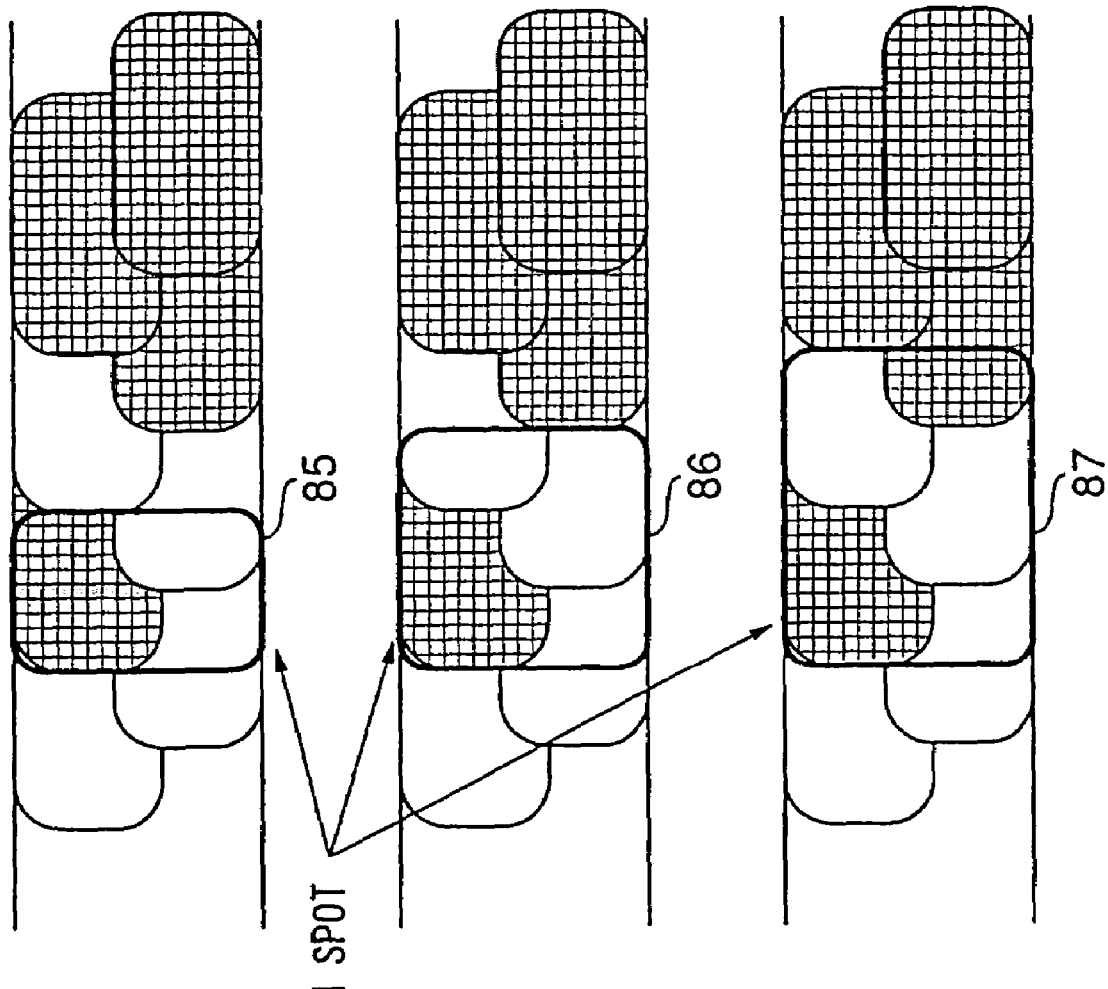

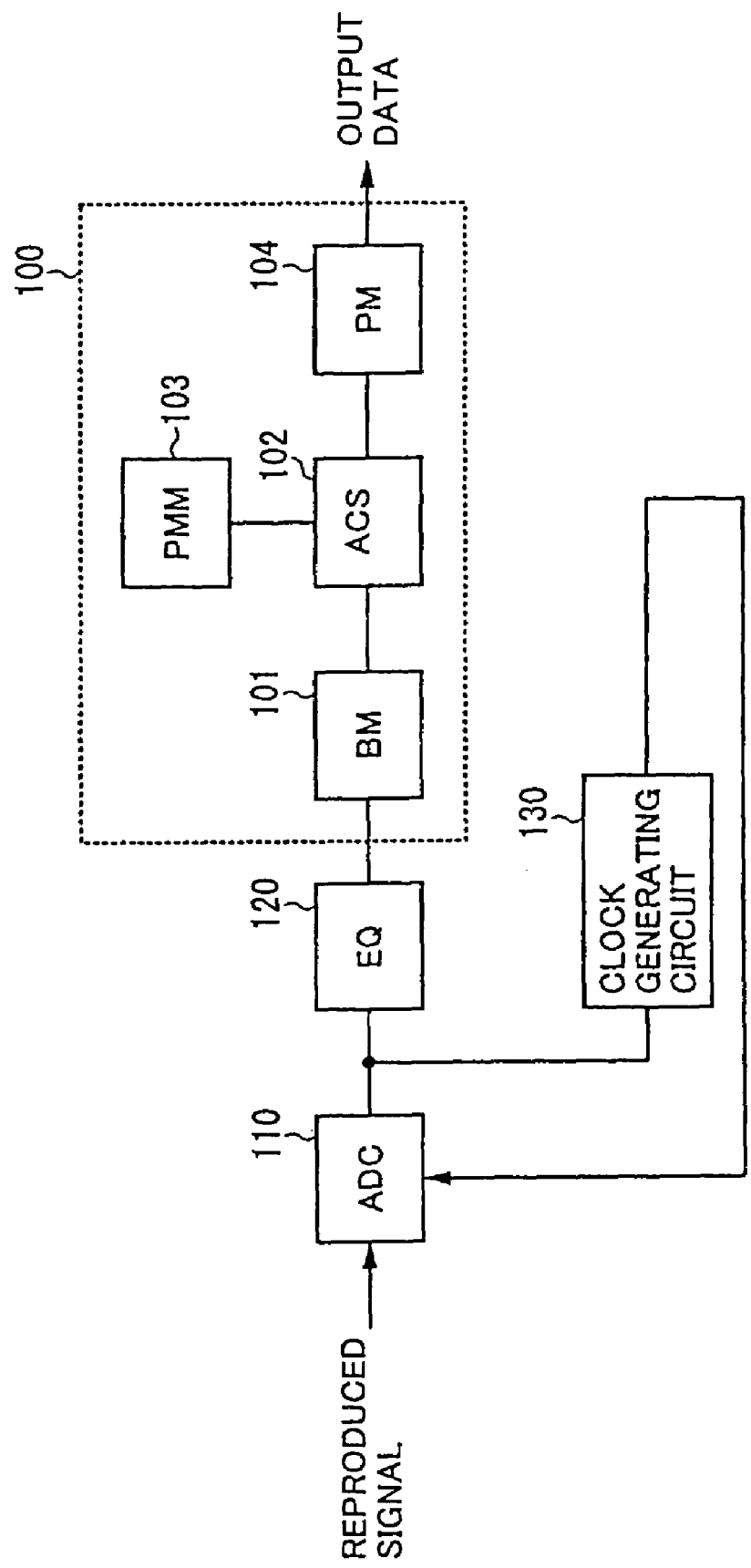

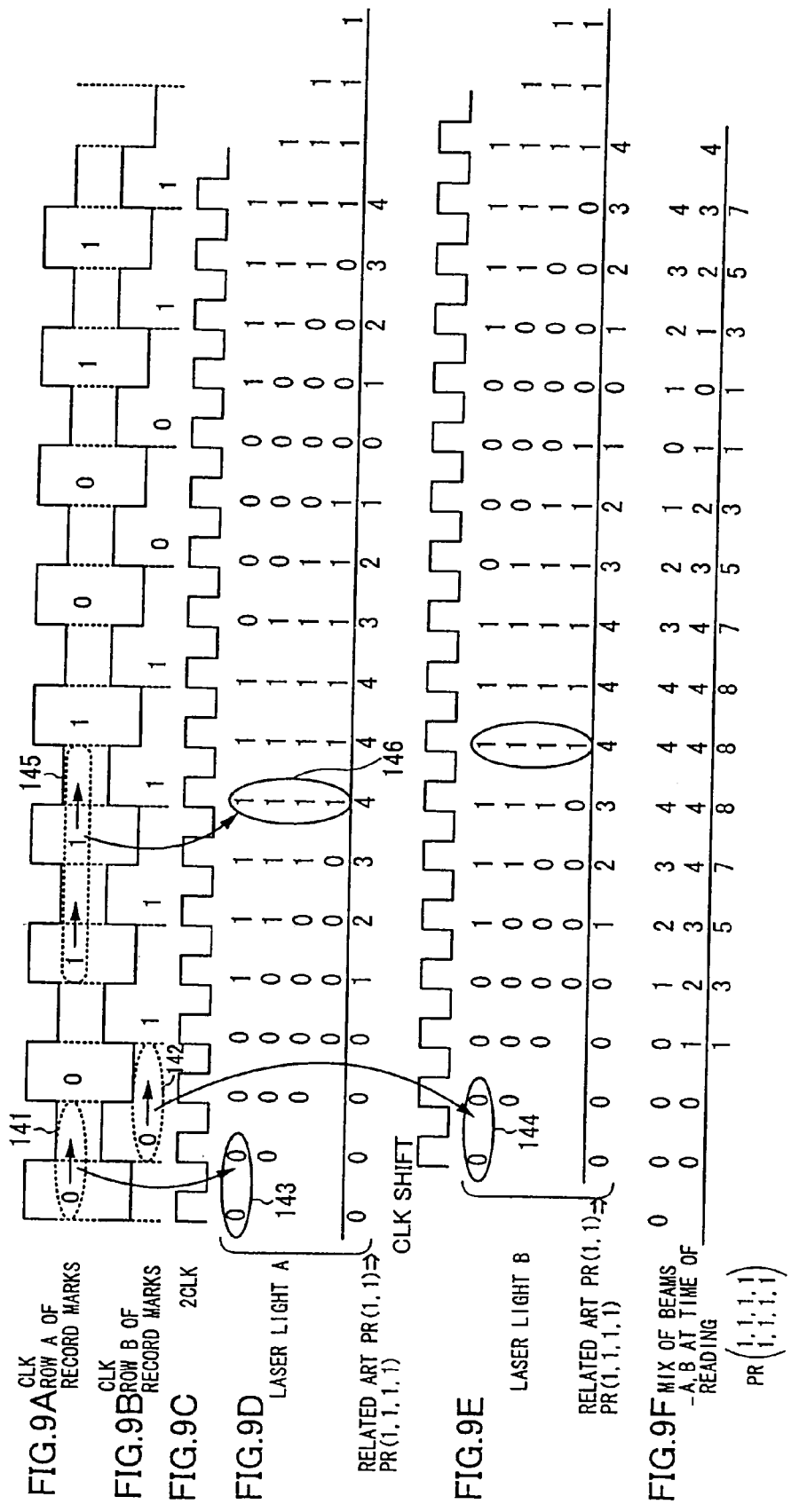

DRIVING SIGNAL

MAGNETIC-FIELD SIGNAL

BEAM SPOT   285

286

287

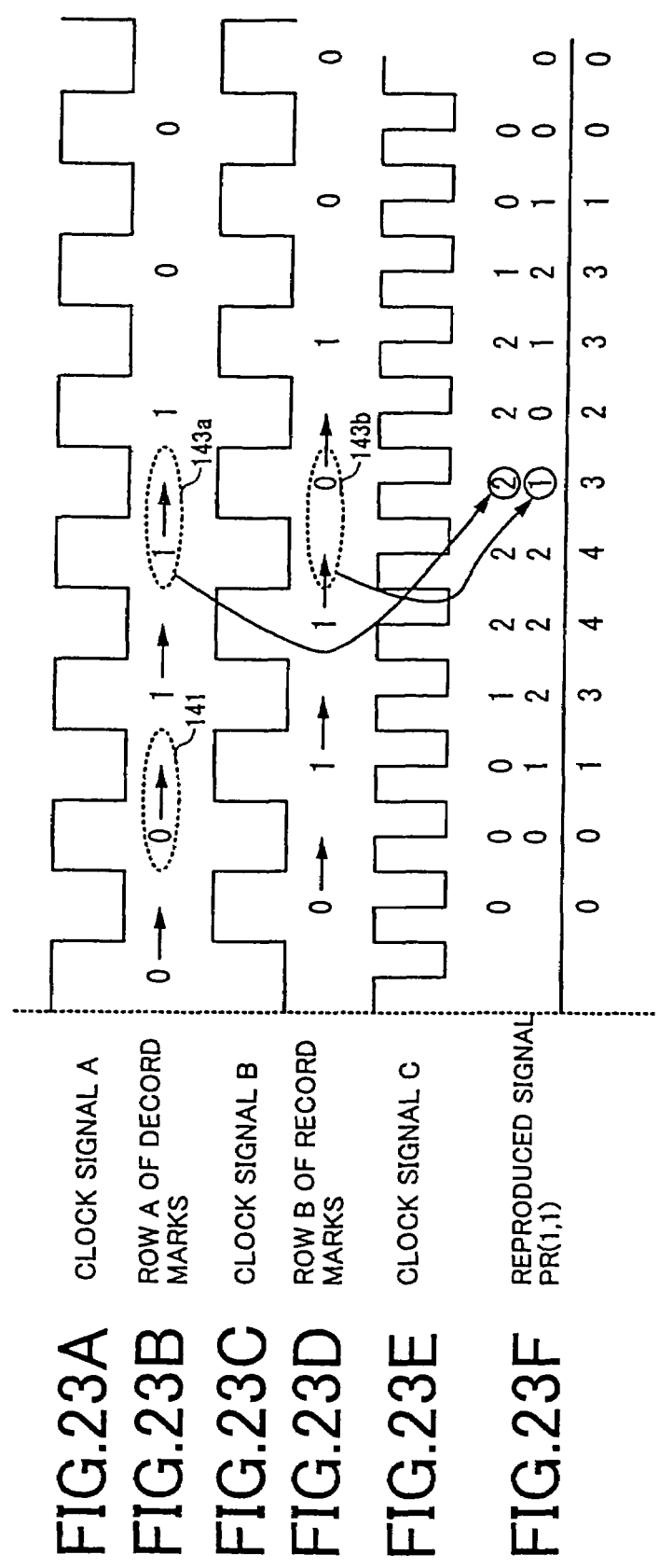

MAGNETO-OPTICAL STORAGE MEDIUM CAPABLE OF RECORDING PLURAL ROWS OF MARKS ON EACH TRACK

This is a divisional of application Ser. No. 10/460,803, filed Jun. 11, 2003, which is now U.S. Pat. No. 6,801,479, issued Oct. 5, 2004, which is a divisional of Ser. No. 09/723,233, filed Nov. 27, 2000, which is now U.S. Pat. No. 6,600,698, issued Jul. 29, 2003.

BACKGROUND OF THE INVENTION

1. Field of the Invention

The present invention relates to an optical disk recording method, an optical disk reproducing method, an optical recording medium using the method, and an optical disk drive, and, in particular, to an optical disk recording method, an optical disk reproducing method, an optical recording medium using the method, and an optical disk drive for recording data at high density and reproducing the data thus recorded at high density.

2. Description of the Related Art

Recently, as optical recording media (optical disk, magneto-optical disk and so forth) come to have large capacities, low costs, high reliabilities, and so forth, they have become used in various fields such as recording/reproducing of image information, recording/reproducing of various code data in computer systems, and so forth.

Especially, optical disk drives are demanded to have further large capacities, and need to use recording/reproducing methods of recording data at high density, and reproducing with high accuracy the data recorded at high density.

As a recording/reproducing method for high-density data recording and high-accuracy data reproducing onto optical recording media, a method of shortening of laser wavelength and relative shortening of spot diameter through improvement of numerical aperture (NA) have been performed, for example.

Further, as a recording/reproducing method for high-density data recording and high-accuracy data reproducing onto an optical recording medium of a magneto-optical recording system, shortening of record mark through magnetic-field modulation recording has been performed, for example.

In the related art, for optical recording media in the magneto-optical recording system, record marks through magnetic-field modulation recording are recorded successively with portions thereof overlapped with one another, a recording density in a track direction (referred to as a line density, hereinafter) is increased in comparison to a track width, and, thus, the total recording density is increased. Further, the track width is shortened, a recording density in a radial direction (referred to as a track density, hereinafter) is increased, and, thus, the total recording density is also increased.

Thus, in order to increase a recording density, a line density is increased, and/or a track density is increased.

However, when a track density is increased, in a case where interference of diffracted light is used as in a tracking error detecting system employing a push-pull method, a tracking signal is degraded when the track width is shortened to be less than a predetermined width. For example, in a case where a laser wavelength is 650 nm and a numerical aperture is 0.6, the tracking signal is degraded when the track width is less than approximately 0.505 μm. Accordingly, there is a limit of improvement in track density.

When a line density is increased, because record marks are record successively with portions thereof overlapped with one another, crescent patterns of the record marks come to be emphasized. Such crescent record marks have curvature at end portions thereof increased when the track width increases, and portions which are not effective for reproducing increase.

Especially, in a case of MSR (Magnetically-induced Super Resolution) medium of double mask type, the crescent pattern of a record mark and a reproducing aperture (magnetic window) are exactly reverse in curvature. Accordingly, a resulting reproduced signal is degraded.

Thus, there is a limit of increase in recording density for each of the methods of increasing line density and increasing track density.

SUMMARY OF THE INVENTION

The present invention has been devised in consideration of those points, and, an object of the present invention is to provide an optical disk recording method, an optical disk reproducing method, an optical recording medium using the method and an optical disk drive by which it is possible to record a plurality of rows of data in a single track, and reproduce the thus-recorded plurality of rows of data.

An optical disk recording method of recording-data on an optical disk by applying laser light to a track of the optical disk, according to the present invention comprises the steps of:

a) driving a plurality of laser light sources in sequence in a time division manner, and applying a light flux to one track of the optical disk successively; and b) producing a plurality of rows of record marks in the one track.

In this method, a plurality of laser light sources are driven in sequence, and a light flux is applied to one track thereby in sequence. Then, a plurality of rows of record marks are produced in the track of the optical disk. At this time, because the plurality of laser light sources are driven in sequence, there is no case where a plurality of light fluxes are applied simultaneously. Accordingly, it is possible to produce a plurality of rows of record marks in one track, avoiding optical interference between the plurality of light fluxes.

In order to improve the recording density of the optical disk, it is preferable that the step b) produces the plurality of rows of record marks in such a manner that the rows of record marks overlap partially with one another.

In this method, because the rows of record marks overlap partially with one another, it is possible to improve the line density. Further, because the plurality of rows of record marks are cut off by one another at the end portions thereof, it is possible to prevent the curvature of the record marks from increasing. Accordingly, it is possible to reduce problems that the curvature of the record marks and the curvature of the reproduction aperture (window) do not coincide in MSR (Magnetically-induced Super Resolution) reproduction by which record marks smaller than the beam spot can be reproduced using a magnetic mask. With regard to MSR reproduction of double mask type, see Japanese Laid-Open Patent Application No. 7-244877.

In order to apply the method to a magneto-optical disk, a magnetic field may be generated in the track of the magneto-optical disk by one magnetic head.

In this method, it is possible to produce plurality of rows of record marks partially overlapping each other in one track of a magneto-optical disk through a simple configuration.

In order to reproduce data from an optical disk in which a plurality of rows of record marks are recorded in one track, with high accuracy, an optical disk reproducing method of reproducing data recorded on an optical disk on which a plurality of rows of record marks are formed in one track, by applying laser light to the track, according to the present invention, comprises the steps of:

a) driving a plurality of laser light sources in sequence by a time division manner, and applying a light flux to one track of the optical disk successively;

b) causing reflected light to be generated from the plurality of rows of record marks by the incident light flux successively, mixing the reflected light, and reproducing a signal changing according to states of the plurality of rows of record marks; and c) demodulating the data recorded in the track from the reproduced signal according to a predetermined decoding algorithm.

In this method, a reading light flux is applied to one track, and reflected light is caused to be generated from a plurality of rows of record marks to which the light flux is applied, in sequence. The reflected light is signals changing according to states of the record marks to which the light flux is applied, and, from the signals, the data recorded in the track of the optical disk can be obtained through demodulation according to a predetermined decoding algorithm.

Interference occurs between respective reflected light from record marks of a plurality of rows of record marks to which a light flux is applied. Accordingly, the signal changing according to the states of the plurality of rows of record marks contains interference between the reflected light from the plurality of rows of record marks, and the data may be demodulated after sampling from the interference-containing signal, through a Viterbi decoding algorithm.

In this method, because the data is demodulated, after sampling from the signal containing interference between the reflected light from the plurality of rows of record marks, through a Viterbi decoding algorithm, it is possible to obtain more probable data through demodulation at high accuracy.

Process can be performed easily when reflected light from record marks generated according to a light flux applied thereto successively in a time division manner by a plurality of laser light sources can be treated as g single reflected light. Accordingly, the signal changing according to the states of the plurality of rows of record marks is obtained from converting the reflected light generated in sequence from the plurality of rows of record marks by the light flux from the laser light sources driven at a frequency equal to or higher than the Nyquist frequency into electric signals, and mixing the electric signals; and the data may be demodulated through a Viterbi decoding algorithm after sampling at predetermined periods from the mixed signal.

In this method, because laser light sources are driven at a frequency equal to or higher than the Nyquist frequency, a plurality of light fluxes are applied to one track at very short intervals in sequence in a time division manner. Accordingly, a reproduced signal obtained from converting the reflected light and mixing it can be regarded as a reproduced signal obtained from applying one light flux to the plurality of rows of record marks simultaneously. Further, by demodulating the reproduced signal by the Viterbi decoding algorithm, it is possible to obtain more probable data at high accuracy through the demodulation.

Thus, it is possible to provide an optical disk recording method of producing a plurality of rows of record marks in one track of an optical recording medium in such a manner that the rows of record marks overlap with each other partially, and to provide an optical disk reproducing method of reproducing data from the thus-recorded record marks.

In order to achieve an optical recording medium having an improved recording medium, in an optical recording medium according to the present invention on which data is recorded as a result of laser light being incident in a recording track and a magnetic field being generated therein, a plurality of rows of record marks are recorded in each track in such a manner that the plurality of rows of record marks partially overlap one another.

In the recording medium, because a plurality of rows of record marks are recorded in each track, it is possible to improve a recording density of record marks in a radial direction of the recording medium. Further, because the plurality of rows of record marks partially overlap one another, it is possible to further improve a recording density of record marks of the recording medium.

Further, because the plurality of record marks are cut off by each other at the end portions thereof, it is possible to prevent the curvature of the record marks from increasing. Accordingly, it is possible to reduce the portions of the record marks which are not effective for reproduction.

The optical recording medium may be a magneto-optical disk.

This recording medium can be achieved from a magneto-optical disk, for example, on which data can be rewriteable. The recording medium merely should be overwriteable, and may be achieved by a phase-change optical disk.

Thus, it is possible to provide an optical recording medium in which a plurality of rows of record marks are produced in one track of an optical recording medium in such a manner that the rows of record marks overlap with each other partially.

In order to achieve an optical disk drive which can record data in a track of an optical disk at high density, an optical disk drive for recording data on an optical disk by applying laser light to a track of the optical disk, according to the present invention, comprises a light-flux applying part driving a plurality of laser light sources in sequence in a time division manner, and applying a light flux to one track of the optical disk successively; and producing a plurality of rows of record marks in the one track.

In this optical disk drive, a plurality of laser light sources are driven in sequence, and a light flux is applied to one track thereby in sequence. Then, a plurality of rows of record marks are produced in the track of the optical disk. At this time, because the plurality of laser light sources are driven in sequence, there is no case where a plurality of light fluxes are applied simultaneously. Accordingly, it is possible to produce a plurality of rows of record marks in one track, avoiding optical interference between the plurality of light fluxes.

In order to improve recording density of the optical disk, it is preferable that the light-flux applying part applies the light flux to the track in a manner such as to produces the plurality of rows of record marks in such a manner that the rows of record marks overlap partially with one another.

In this optical disk drive, because the rows of record marks overlap partially with one another, it is possible to improve the line density. Further, because the plurality of rows of record marks are cut off by one another at the ends thereof, it is possible to prevent the curvature of the record marks from increasing. Accordingly, it is possible to reduce the portions of the record marks which are not effective in reproduction.

In order to apply this optical disk drive to a magneto-optical disk, the optical disk drive may further comprise a magnetic-field generating part generating a magnetic field in the track of the magneto-optical disk by one magnetic head.

In this optical disk drive, it is possible to produce plurality of rows of record marks partially overlapping each other in one track of a magneto-optical disk through a simple configuration.

In order to reproduce data from an optical disk in which a plurality of rows of record marks are recorded in one track, with high accuracy, an optical disk drive for reproducing data recorded on an optical disk on which a plurality of rows of record marks are formed in one track, by applying laser light to the track, according to the present invention, comprises:

a reading light-flux applying part driving a plurality of laser light sources in sequence by a time division manner, and applying a light flux to one track of the optical disk successively;

a reproducing part causing reflected light to be generated from the plurality of rows of record marks by the incident light flux successively, mixing the reflected light, and reproducing a signal changing according to states of the plurality of rows of record marks; and a demodulating part demodulating the data recorded in the track from the reproduced signal according to a predetermined decoding algorithm.

In this optical disk drive, a reading light flux is applied to one track, and reflected light is caused to be generated from a plurality of rows of record marks to which the light flux is applied, in sequence. The reflected light is signals changing according to states of the record marks to which the light flux is applied, and, from the signals, the data recorded in the track of the optical disk can be obtained through demodulation according to a predetermined decoding algorithm.

Interference occurs between respective reflected light from record marks of a plurality of rows of record marks to which a light flux is applied. Accordingly, the demodulating part may comprise:

a sampling part sampling at predetermined periods from the signal containing interference between the reflected light from the plurality of rows of record marks; and a Viterbi decoding part demodulating the data from the thus-sampled data by a Viterbi decoding algorithm.

In this method, because the data is demodulated by sampling from the signal containing interference between the reflected light from the plurality of rows of record marks, through a Viterbi decoding algorithm, it is possible to obtain more probable data through demodulation at high accuracy.

Process can be performed easily when reflected light from record marks generated according to a light flux applied thereto successively in a time division manner by a plurality of laser light sources can be treated as one reflected light. Accordingly, the reproducing part may comprise a reproduced signal generating part converting the reflected light generated in sequence from the plurality of rows of record marks by the light flux from the laser light sources driven at a frequency equal to or higher than the Nyquist frequency into electric signals, and mixing the electric signals.

In this optical disk drive, because laser light sources are driven at a frequency equal to or higher than the Nyquist frequency, a plurality of light fluxes are applied to one track at very short intervals in sequence in a time division manner. Accordingly, a reproduced signal obtained from converting the reflected light and mixing it can be regarded as a reproduced signal obtained from applying one light flux to the plurality of rows of record marks simultaneously. Further, by demodulating the reproduced signal by the Viterbi decoding algorithm, it is possible to obtain more probable data at high accuracy through the demodulation.

Thus, it is possible to provide an optical disk drive for producing a plurality of rows of record marks in one track of an optical recording medium in such a manner that the rows of record marks overlap with each other partially, and for reproducing data from the thus-recorded record marks.

In order to form a plurality of rows of record marks in one track of an optical disk and record data at high accuracy, an optical disk recording method of recording data on an optical disk by applying laser light to a track of the optical disk, according to the present invention., comprises the steps of:

a) applying a light flux to the track successively in such a manner that the thus-incident light flux crosses the track to-and-fro obliquely; and b) producing a plurality of rows of record marks in the track.

In this method, a light flux is applied to one track successively. Thereby, a plurality of rows of record marks are formed in the track. At this time, because the plurality of laser light sources are driven in sequence, there is no case where a plurality of light fluxes are applied simultaneously. Accordingly, it is possible to produce a plurality of rows of record marks in one track, avoiding optical interference between the plurality of light fluxes.

In order to reproduce data from an optical disk on which a plurality of rows of record marks are formed in one track, at high accuracy, an optical disk reproducing method of reproducing data recorded in a track of an optical disk on which a plurality of rows of record marks are formed in one track, by applying laser light to the track, according to the present invention, comprises the steps of:

a) applying a reading light flux to the track successively for the plurality of rows of record marks in such a manner that the thus-incident light flux crosses the track to-and-fro obliquely; and b) causing reflected light to be generated from the plurality of rows of record marks by the incident light flux successively, mixing the reflected light, and reproducing a signal changing according to states of the plurality of rows of record marks; and c) demodulating the data recorded in the track from the reproduced signal according to a predetermined decoding algorithm.

In this method, a reading light flux is applied to one track, and reflected light is caused to be generated from a plurality of rows of record marks to which the light flux is applied, in sequence. These reflected light is signals changing according to states of the record marks to which the light flux is applied, and, from the signals, the data recorded in the track of the optical disk can be obtained through demodulation according to a predetermined decoding algorithm.

In order to form one row of record marks in one track of an optical disk and to enable downward comparability, the light-flux applying part may cause the positions of the plurality of rows of record marks to be equal to each other.

By causing the positions of the plurality of rows of record marks to be equal to each other by making the positions in the track to be irradiated by the plurality of laser light sources driven in sequence in a time division manner be equal, it is possible to treat the record marks produced in the track as one row of record marks. Accordingly, the optical disk drive is downward compatible.

In order to reproduce data from an optical disk on which one row of record marks are formed in one track and to enable downward comparability, the reading light-flux applying part may drive one of the plurality of laser light sources, and apply the reading light flux to the track successively; and reproduce from a row of record marks recorded in the track by the incident light flux.

By reproducing from one row of record marks produced in one track by driving one laser light source of the plurality of laser light sources, it is possible to reproduce from the one row of record marks formed in the track. Accordingly, the optical disk derive is downward compatible.

An optical disk recording method of recording data on an optical disk by applying laser light to a track of the optical disk, according to another aspect of the present invention, comprises the steps of:

a) driving a laser light source and outputting the laser light;

b) controlling a position on which the thus-output laser light is incident in one track in a radial direction of the optical disk; and c) producing a plurality of rows of record marks in the track, row by row.

In this method, a laser light source is driven and the laser light is output therefrom. At this time, a position at which the thus-output laser light is applied to is controlled in one track, in a radial direction of the optical disk. Because a plurality of rows of record marks are produced in the track, row by row, in sequence, it is possible to produce a plurality of rows of record marks in one track with one laser light source.

The present invention in the other aspect can also be applied to a magneto-optical disk.

Further, the plurality of rows of record marks may be produced such a manner that the positions of the plurality of rows of record marks are made to be equal to each other in a rotation direction of the optical disk, and the record marks the positions of which are equal to each other in the rotation direction are made to have the same state. Thereby, it is possible to achieve downward compatibility.

In order to reproduce data from an optical disk on which a plurality of rows of record marks are formed in one track, at high accuracy, an optical disk reproducing method of reproducing data recorded in a track of an optical disk on which a plurality of rows of record marks are formed in one track, by applying laser light to the track, according to the present invention, comprises the steps of:

a) driving a single laser light source and applying a reading light flux to one track;

b) simultaneously causing reflected light to be generated from the plurality of rows of record marks by the applied light flux, mixing the reflected light, and reproducing a signal changing according to states of the plurality of rows of record marks; and c) demodulating the data recorded in the track from the thus-reproduced signal according to a predetermined decoding algorithm.

In this method, a reading light flux is applied to one track, and simultaneously causing reflected light to be generated from the plurality of rows of record marks by the applied light flux. The reflected light is signals changing according to states of the record marks included in a portion of the track to which the light flux is applied, and, it is possible to demodulate the data recorded in the track of the optical disk from these signals according to the predetermined decoding algorithm.

In order to achieve an optical disk drive recording data in a track of an optical disk at high density, an optical disk drive for recording data on an optical disk by applying laser light to a track of the optical disk, according to the other aspect of the present invention, comprises:

a laser outputting part driving a single laser light source and outputting the laser light; and a light-flux controlling part controlling a position at which the thus-output laser light is applied to the optical disk in one track, in a radial direction of the optical disk, and producing a plurality of rows of record marks in the track, row by row.

In this optical disk drive, a single laser light source is driven and the laser light is output therefrom. At this time, a position at which the thus-output laser light is applied to is controlled in one track, in a radial direction of the optical disk. Because a plurality of rows of record marks are produced in the track, row by row, in sequence, it is possible to produce a plurality of rows of record marks in one track with a single laser light source.

In order to reproduce data from an optical disk on which a plurality of rows of record marks are formed in one track, at high accuracy, an optical disk drive for reproducing data recorded in a track of an optical disk on which a plurality of rows of record marks are formed in one track, by applying laser light to the track, according to the other aspect of the present invention, comprises:

a reading light-flux applying part driving a single laser light source and applying a reading light flux to one track;

a signal reproducing part simultaneously causing reflected light to be generated from the plurality of rows of record marks by the applied light flux, mixing the reflected light, and reproducing a signal changing according to states of the plurality of rows of record marks; and a demodulating part demodulating the data recorded in the track from the thus-reproduced signal according to a predetermined decoding algorithm.

In this optical disk drive, a reading light flux is applied to one track, and simultaneously causing reflected light to be generated from the plurality of rows of record marks by the applied light flux. The reflected light is signals changing according to states of the record marks included in a portion to which the light flux is applied, and, it is possible to demodulate the data recorded in the track of the optical disk from these signals according to the predetermined decoding algorithm.

Thus, according to the other aspect of the present invention, it is possible to provide an optical disk recording method of producing with one light source a plurality of rows of record marks in one track of an optical recording medium in such a manner that the rows of record marks overlap with each other partially, and to provide an optical disk reproducing method of reproducing with one light source data from the thus-recorded record marks.

Further, it is possible to provide an optical disk drive for producing with one light source a plurality of rows of record marks in one track of an optical recording medium, and for reproducing with one light source data from the thus-recorded record marks.

Other objects and further features of the present invention will become more apparent from the following detailed description when read in conjunction with the accompanying drawings.

BRIEF DESCRIPTION OF THE DRAWINGS

FIG. 1B shows a block diagram showing an example of configuration of an optical system shown in FIG. 1A;

FIGS. 2A, 2B and 2C show timing charts showing signal strings controlling data recording of the optical disk drive shown in FIG. 1A;

FIGS. 3A and 3B show examples of rows of record marks recorded in a track of the optical disk shown in FIGS. 1A and 1B;

FIGS. 5A through 5E show timing charts showing signal strings controlling data recording of rows of record marks shown in FIG. 3B;

FIGS. 6A, 6B and 6C show relationships between curvature of record marks and reproduction;

FIGS. 7A, 7B and 7C show examples of beam spots in a case where two beam spots are regarded as one beam spot;

FIG. 8 shows a block diagram showing an example of configuration of a data reproducing system;

FIGS. 9A through 9F show one example showing a relationship between record marks and clock signals;

FIGS. 23A through 23F show one example indicating a relationship between record marks and clock signals in the optical disk drive shown in FIG. 17.

DETAILED DESCRIPTION OF THE PREFERRED EMBODIMENTS

Figure 1A:
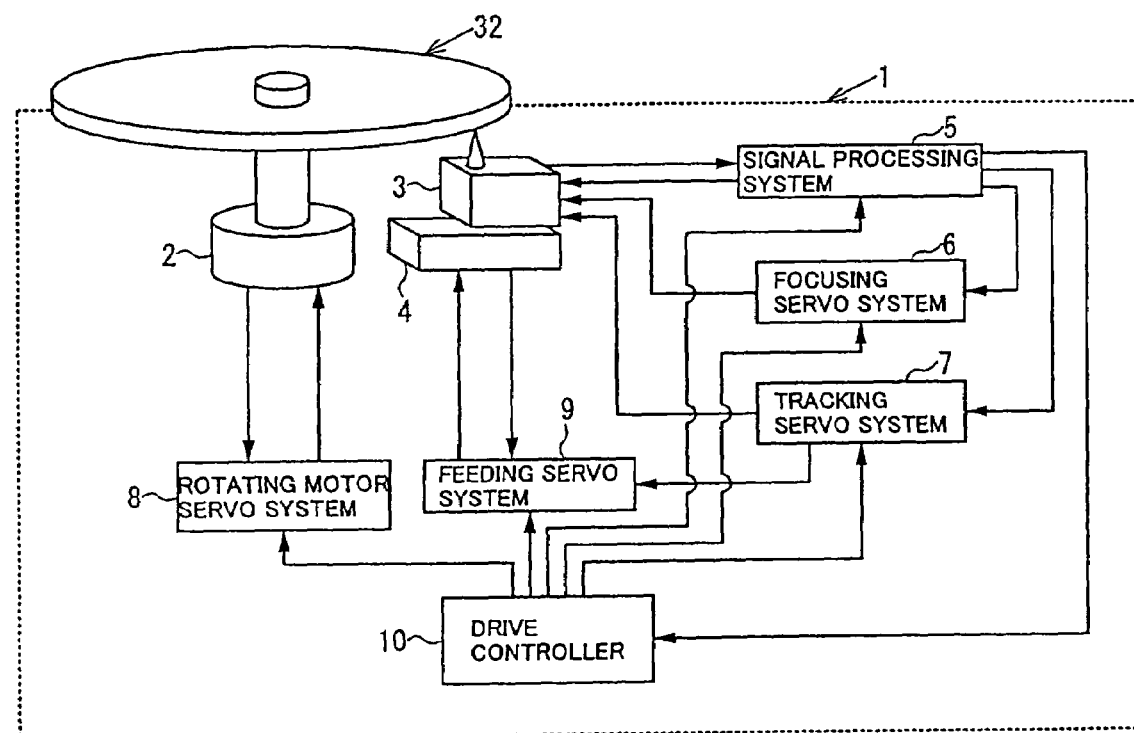
FIG. 1A shows a block diagram roughly showing an example of configuration of an opitcal disk drive in a first embodiment of the present invention.

FIG. 1A shows an optical disk drive in a first embodiment of the present invention.

The optical disk drive 1 includes a focusing servo system 6, a tracking servo system 7 and a feeding servo system 9 which control laser light to a desired position on an optical disk 32, a motor 2 which rotates the optical disk 32, a rotating motor servo system 8 which controls a rotation speed of the optical disk 32, an optical system 3 which applies the laser light to the optical disk 32 and outputs the reflected light as a reproduced signal, a feeding motor 4 which moves the optical system 3, a signal processing system 5 which receives the reproduced signal and performs signal processing on the signal, and a drive controller 10 which controls operations of the respective systems.

In FIG. 1A, the focusing servo system 6 controls the optical system 3 so that the focus position of the laser light is always located on the recording surface of the optical disk 32. The tracking servo system 7 controls the optical system 3 so that the laser light follows a track of the optical disk 32. The feeding servo system 9 controls the feeding motor 4 so that the laser light moves to a desired track of the optical disk 32 at high speed.

Through the optical disk drive 1, it is possible to record a plurality of rows of record marks on one track of the optical disk 32.

FIG. 1B shows an example of a configuration of the optical system 3 of the optical disk drive 1 shown in FIG. 1A.

This example has two optical systems.

In FIG. 1B, LD (Laser Diode) driving circuits 10 and 12 have pulse-like driving signals A and B, such as those shown in FIGS. 2A and 2B, provided thereto at a time of data recording.

These driving signals A and B have phases different by 180°, and, accordingly, it can be said that pulse-like driving signals are provided to the LD driving circuits 10 and 12 alternately. Accordingly, the LD driving circuits 10 and 12 cause LD 14 and LD 16 to which those circuits are connected to emit light alternately.

Laser light emitted by the LD 14 is reflected by a beam splitter (BS) 18, passes through a beam splitter 20, and is incident on an optical disk 32 through a lens 30.

Laser light emitted by the LD 16 passes through the beam splitter (BS) 18, passes through the beam splitter 20, and is incident on the optical disk 32 through the lens 30.

The lens 30 condenses the provided laser light so as to cause the laser light to focus on the surface of the optical disk 32, and forms a beam spot thereon.

When the optical disk 32 is a magneto-optical disk, the optical disk drive includes a magnetic head having a magnetic-field signal shown in FIG. 2C provided thereto and generating a magnetic field on the surface of the optical disk 32.

FIGS. 3A and 3B show examples of record marks recorded in a track of the optical disk shown in FIGS. 1A and 1B.

The recording method may be according to any one of optical modulation, magnetic-field modulation, and so forth.

FIG. 3A shows one track 40 of the optical disk 32. A row 42 of record marks are recorded in an upper half of the track in the figure while a row 44 of record marks are recorded in a lower half of the track in the figure.

Each of these rows 42 and 44 of record marks consists of a plurality of record marks 46 or 48, which are recorded rightward from the left end one 46 or 48 in sequence.

For example, when the record mark 46a at the left end of the row 42 of record marks is produced, the record mark 48a at the left end of the row 44 of record marks is recorded with a portion thereof overlapping the record mark 46a.

Further, the record mark 46b subsequent to the left end one is recorded with portions thereof overlapping the record marks 46a and 48a.

Subsequently, the record marks 48b, 46c, 48c, . . . are recorded in sequence in the same manner.

When the optical disk 32 is the magneto-optical disk, the optical disk drive applies light to a portion at which the record mark 46 or 48 is produced, and, simultaneously, generates a magnetic-field region 50 such as to at least cover thereby the portion irradiated by a beam spot. Thereby, at the portion irradiated by the beam spot, the record mark 46 or 48 in which a direction of magnetic field is changed to the direction of the magnetic field of the magnetic-field region 50 is recorded. The magnetic-field region 50 can be generated by one magnetic head.

A relationship between displacement of the recording marks 46 and 48 and displacement of the laser light sources will now be described briefly.

Figure 4A:
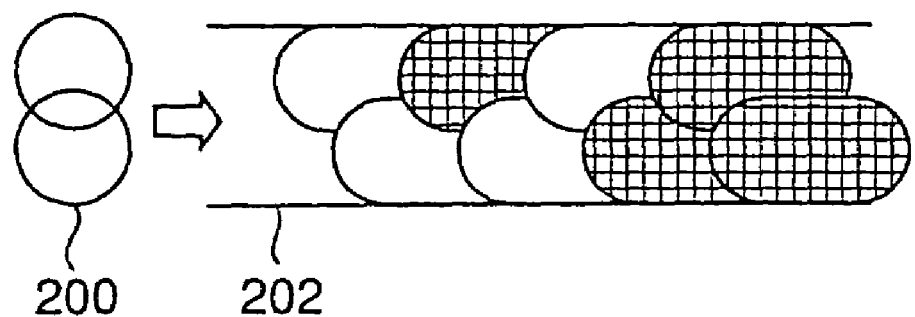
FIGS. 4A and 4B show examples illustrating relationships between displacement of laser light sources and displacement of record marks.
Figure 4B:
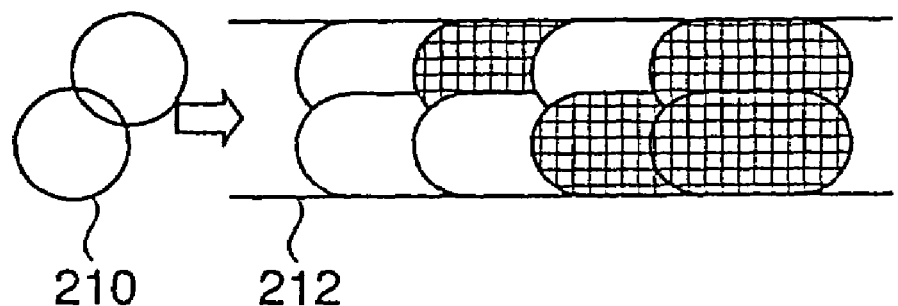

FIGS. 4A and 4B illustrate the relationship between displacement of the recording marks 46 and 48 and displacement of the laser light sources.

FIG. 4A shows a case where positions of laser light sources 200 are same. In this confutation, by driving the laser light sources in sequence, it is possible to produce record marks different in position in one track 202, as shown in the figure.

FIG. 4B shows a case where positions of laser light sources 210 are different. In this confutation, by driving the laser light sources in sequence, it is possible to produce record marks same in position in one track 212, as shown in the figure.

When record marks same in position are produced as a result of the laser light sources 210 being disposed differently in position as shown in FIG. 4B, and record marks same in position are assumed as the same records, it is possible to produce rows of record marks which can be regarded as one row of record marks in one track 212 using the plurality of laser light sources 210.

Accordingly, the optical disk drive according to the present invention is downward compatible. Further, at a time of reproduction, as a result of one of the plurality of laser light sources being driven and reproduction being performed, the optical disk drive according to the present invention is downward compatible.

The number of rows 42, 44 of record marks recorded in one track is not limited to two as in the example shown in FIG. 3A It is possible to record rows of record marks corresponding to the number of LDs. For example, it is possible to record four rows of record marks as shown in FIG. 3B.

FIG. 3B shows one track 60 of the optical disk 32.

Rows 62, 64, 66 and 68 of record marks, in the order from the top in the figure, are recorded in the track, as shown in the figure.

Each of these rows 62, 64, 66 and 68 of record marks consists of a plurality of record marks 72, 74, 76 or 78 which are recorded rightward from the left end one 72, 74, 76 or 78 in sequence.

In a case where 4 rows of record marks are recorded in one track as shown in FIG. 3B, the optical disk drive is configured to have four optical systems, that is, four LD driving circuits and four LDs. FIGS. 5A, 5B, 5C, 5D and 5E show an example of signals controlling data recording in the optical disk drive in this case. FIGS. 5A, 5B, 5C, 5D and 5E show signals controlling data recording for the rows of record marks shown in FIG. 3B.

For example, in the optical disk drive configured to include four LD driving circuits and four LDs, pulse-like driving signals A through D shown in FIGS. 5A through 5D are provided to the four driving circuits, respectively. As shown in FIGS. 5A through 5D, the driving signals A through D are provided to the four LD driving circuits so that the four LDs emit light in sequence.

When the optical disk 32 is a magneto-optical disk, the optical disk drive is configured to include a magnetic head having a magnetic-field signal shown in FIG. 5E provided thereto and generating a magnetic field on the surface of the optical disk 32.

Thus, in a case where a plurality of rows of record marks are recorded in one track as mentioned above, it is possible to record a plurality of rows of record marks in one track by providing LD driving circuits and LDs corresponding to the number of the rows of record marks.

Further, by producing record marks with portions thereof overlapping each other by causing LDs to emit light in sequence, it is possible to avoid interference between laser light emitted by the LDs, and, also, to improve the recording density. Further, because end portions of the record marks are cut off by each other, it is possible to prevent curvatures of the record marks from being enlarged, and, to reduce the portions of the record marks not effective for reproduction.

With reference to FIGS. 6A, 6B and 6C, prevention of curvatures of the record marks from being enlarged and reduction of the portions of the record marks not effective for reproduction will now be described.

In FIG. 6A, when reproduction is performed from a record mark 80, the region effective in the reproduction is a region enclosed by the rectangular drawn by the thick line in the figure. The same manner is applied to a case where a plurality of rows of record marks are recorded in one track as shown in FIG. 6B.

However, when a plurality of rows of record marks are recorded in one track with portions thereof overlapping one another laterally as shown in FIG. 6C, it is possible to enlarge the widths of the record marks to be recorded first, in comparison to the case of FIG. 6B.

It is noted that, when the record marks recorded first have the larger widths, no problem occurs because portions thereof are overwritten by the record marks recorded subsequently.

Accordingly, the record marks 82 are prevented from having crescent shapes, and the regions effective in reproduction can be enlarged.

Description will now be made for reproduction of record marks recorded in one track as shown in FIGS. 3A and 3B with reference to FIG. 1B.

In FIG. 1B, at a time of data reproduction, the LD driving circuits 10 and 12 have pulse-like driving signals A and B provided thereto such as those to cause the LDs 14 and 16 to emit light in synchronization with the record marks or pulse-like driving signals A and B provided thereto such as those to cause the LDs 14 and 16 to emit light at a frequency equal to or higher than the Nyquist band of the record marks.

For example, when pulse-like driving signals A and B such as those to cause the LDs 14 and 16 to emit light in synchronization with the record marks are provided to the LD driving circuits 10 and 12, the LD driving circuits 10 and 12 cause the LDs 14 and 16, to which they are connected respectively, to emit light alternately in synchronization with the record marks.

When pulse-like driving signals A and B such as those to cause the LDs 14 and 16 to emit light at a frequency equal to or higher than the Nyquist band of the record marks are provided to the LD driving circuits 10 and 12, the LD driving circuits 10 and 12 cause the LDs 14 and 16, to which they are connected respectively, to emit light alternately at the frequency equal to or higher than the Nyquist band of the record marks.

The laser light emitted by the LD 14 is reflected by the beam splitter 18, passes through the beam splitter 20, and is applied to the optical disk 32 through the lens 30.

The laser light emitted by the LD 16 passes through the beam splitter 18, passes through the beam splitter 20, and is applied to the optical disk 32 through the lens 30.

The lens 30 condenses the incident laser light so as to focus it on the surface of the optical disk 32 and forms a beam spot thereon.

When the beam spot is formed on the optical disk 32, the light reflected by the optical disk 32 passes through the lens 30, is reflected by the beam splitter 20, and is incident on a beam splitter 22.

The light incident on the beam splitter 22 is split according to a polarization component, and is provided to a photodiode (PD) 24 or 26. The photodiode 24 or 26 converts the provided optical signal into an electric signal, and outputs the electric signal to an amplifier 28.

The amplifier 28 amplifies the electric signal provided by the photodiode 24 or 26 and outputs the amplified signal as a reproduced signal.

In a case where reproduction is performed as a result of the LD 14 and LD 16 being caused to emit light alternately in synchronization with the record marks, data can be demodulated as a result of sampling being made from the reproduced signal according to the driving signals A and B provided to the LD driving circuits 10 and 12.

However, in a case where reproduction is performed as a result of the LD 14 and LD 16 being caused to emit light alternately at a frequency equal to or higher than the Nyquist band of the record marks, the reproduced signal is an average of reproduced signals obtained by means of the LD 14 and LD 16. Accordingly, two beam spots formed by the LD 14 and LD 16 are regarded as one beam spot.

FIGS. 7A, 7B and 7C show examples of beam spots in a case where two beam spots are regarded as one beam spot.

In FIGS. 7A, 7B and 7C, beam spots 85, 86 and 87 have different sizes because the sizes of record marks are shown as being equal. However, actually, the beam spots 85, 86 and 87 are same in size.

FIG. 7A shows an example of a case (referred to as interfered four marks, hereinafter) in which four states of record marks are included in an area of the beam spot 85. Accordingly, the reproduced signal obtained by means of the beam spot 85 is a signal mixed from reproduced signals from the four states of record marks.

FIG. 7B shows an example of a case (referred to as interfered six marks, hereinafter) in which six states of record marks are included in an area of the beam spot 86. Accordingly, the reproduced signal obtained by means of the beam spot 86 is a signal mixed from reproduced signals from the six states of record marks.

FIG. 7C shows an example of a case (referred to as interfered eight marks, hereinafter) in which eight states of record marks are included in an area of the beam spot 87. Accordingly, the reproduced signal obtained by means of the beam spot 87 is a signal mixed from reproduced signals from the eight states of record marks.

Thus, the reproduced signal output from the amplifier 28 is a signal mixed from reproduced signals from a plurality of states of record marks included in the area of the beam spot. In other words, it is possible to demodulate the reproduced signal output from the amplifier 28 into the original data, similarly to a case of a reproduced signal from an opitcal disk to which data is recorded after being modulated into a so-called partial response (PR) waveform.

For example, it is possible to detect the most probable data using a Viterbi detector (most likely data detector) after sampling at a predetermined frequency from a reproduced signal from an optical disk to which data is recorded after being modulated into a PR waveform.

FIG. 8 shows an example of a configuration of a data reproducing system.

In FIG. 8, an analog-to-digital converter 110 converts an analog signal of the reproduced signal provided by the amplifier 28 shown in FIG. 1B into a digital signal. A filter may be provided between the amplifier 28 shown in FIG. 1B and the analog-to-digital converter 110 for the purpose of shaping waveform as necessity arises.

The analog-to-digital converter 110 operates in synchronization with a clock signal from a clock generating circuit 130. That is, sampling is made from the above-mentioned reproduced signal by the analog-to-digital converter 110, and the sampled values are output from the analog-to-digital converter 110 in synchronization with the clock signal.

For example, in a case where the LDs 14 and 16 are caused to emit light alternately in synchronization with the record marks and data reproduction is performed, the clock generating circuit 130 outputs the clock signal according to the reproduced record marks.

In a case where the LDs 14 and 16 are caused to emit light alternately at a frequency equal to or higher than the Nyquist band of the record marks and data reproduction is performed, the clock generating circuit 130 outputs the clock signal twice in frequency the clock signal corresponding to the reproduced record marks.

The sampled values from the reproduced signal output from the analog-to-digital converter 110 in sequence in synchronization with the clock signal are provided to the Viterbi detector 100 after undergoing waveform equalization process and so forth by a digital equalizer (EQ) 120.

The Viterbi detector 100 detects record data in accordance with a Viterbi decoding (demodulating) algorithm from the sampled values provided in sequence, and outputs it.

Although not shown in FIG. 8, the above-mentioned digital equalizer 120 and clock generating circuit 130 operate also in synchronization with the clock signal from the clock generating circuit 130.

The Viterbi detector 100 will now be described in detail.

The Viterbi detector 100 includes a branch-metric calculating unit (BM) 101, an ACS (Add-Compare-Select) unit 102, a pass-metric memory (PMM) 103, and a pass memory (PM) 104.

The branch-metric calculating unit 101 calculates branch-metric values (BM values) corresponding to a difference between each expected value which should be obtained from the reproduced signal and the sampled value of the reproduced signal.

The ACS unit 102 adds each of the above-mentioned branch-metric values and the pass-metric value (PM value) preceding by one clock (calculated last time) and stored in the pass-metric memory (PMM) 103 together. Then, the ACS unit 102 compares each two of the thus-obtained pass-metric values (PM values), selects the smaller one thereof. The thus-selected pass-metric value (PM value) is stored in the pass-metric memory 103 as a new pass-metric value. As a result of the above-mentioned process being performed in sequence, the pass-metric value (PM value) becomes the accumulated value of the branch-metric values (BM values).

To thus select the smaller pass-metric value corresponds to select a path of state transition in the Viterbi decoding (demodulating) algorithm. Thus, the ACS unit 102 always selects the path such that the pass-metric value becomes minimum. Then, data (2-level data) corresponding to the selected path is provided to the pass memory (PM) 104 from the ACS unit 104.

In the pass memory (PM) 104, the data corresponding to each selected path is shifted in sequence, and, also, the data corresponding to each path not selected in the process is dismissed in sequence. As a result, the data corresponding to the survivor path is output from the pass memory 104 as output data.

Thus, in a case where light is emitted from the LDs alternately in a frequency equal to or higher than the Nyquist band of the record marks, it is possible to accurately reproduce data-recorded at high density by detecting most probable data using the Viterbi detector.

As a specific example, a procedure of reproducing the interfered eight marks shown in FIG. 7C will now be described.

FIGS. 9A through 9F show one example of relationship between the record marks and clock signals.

FIG. 9A shows a clock signal corresponding to the row A of record marks recorded on the optical disk. The period of the clock signal corresponds to the size of the record mark.

FIG. 9B shows a clock signal corresponding to the row B of record marks recorded on the optical disk. The period of the clock signal corresponds to the size of the record mark.

As shown in FIGS. 9A and 9B, the rows A and B of record marks recorded in one track are different in phase by ½ period When it is assumed that a clock signal twice in frequency the clock signals shown in FIGS. 9A and 9B is a reference, the reproduced signal is obtained twice from one record mark.

For example, through the area 141 enclosed by the broken line shown in FIG. 9A, one state is obtained from one record mark when the clock signal shown in FIG. 9A is used as a reference. However, through the area 143 enclosed by the broken line shown in FIG. 9D, two states is obtained from one record mark when the clock signal shown in FIG. 9C is used as a reference.

Because FIGS. 9A through 9F shows the example of interfered eight marks, each beam spot includes four states of record marks.

This condition is shown in FIGS. 9D and 9E.

For example, the area 145 enclosed by the broken line shown in FIG. 9A corresponds to the area of the beam spot, and includes four states of record marks. The area 146 enclosed by the solid line shown in FIG. 9D shows these four states of record marks. FIG. 9E also shows four states of record marks similarly.

It is noted that each portion of the area of the beam spot corresponding to one clock pulse corresponds to the value "1" or "0". Accordingly, because the area 146 corresponds to four clock pulses of the double clock signal shown in FIG. 9C and encloses the record mark of "1" for the two clock pulses and the other record mark of "1" for the two clock pulses, the resulting value of the reproduced signal is "4" (sum of four "1") as shown in FIG. 9D.

Further, each portion of the area of the beam spot corresponding to one clock pulse corresponds to one state of a record mark. Accordingly, for example, in FIG. 7C (interfered eight marks), the beam spot contains two record marks of the row A each for two clock pulses of the double clock signal ($2 \times 2 = 4$), one record mark for one clock pulse (1), another record mark for two clock pulses (2) and another record mark for one clock pulse (1) of the row B, and, as a result, the total number of states of record marks contained by the beam spot is eight (8).

However, in a case where reproduction is performed through emission of the LD 14 and LD 16 at a frequency equal to or higher than the Nyquist band of the record marks alternately, the reproduced signal output from the amplifier 28 is a mix of reproduced signals obtained by means of the independent laser light A and B. Accordingly, the reproduced signal output from the amplifier 28 is the signal shown in FIG. 9F mixed from the signals shown in FIGS. 9D and 9E.

The reproduced signal output from the amplifier 28 has different states of record marks for the interfered four marks, interfered six marks and interfered eight marks. FIGS. 10A through 14 show the states of record marks different for the interfered four marks, interfered six marks and interfered eight marks, and conditions of state transitions.

Figure 10A:
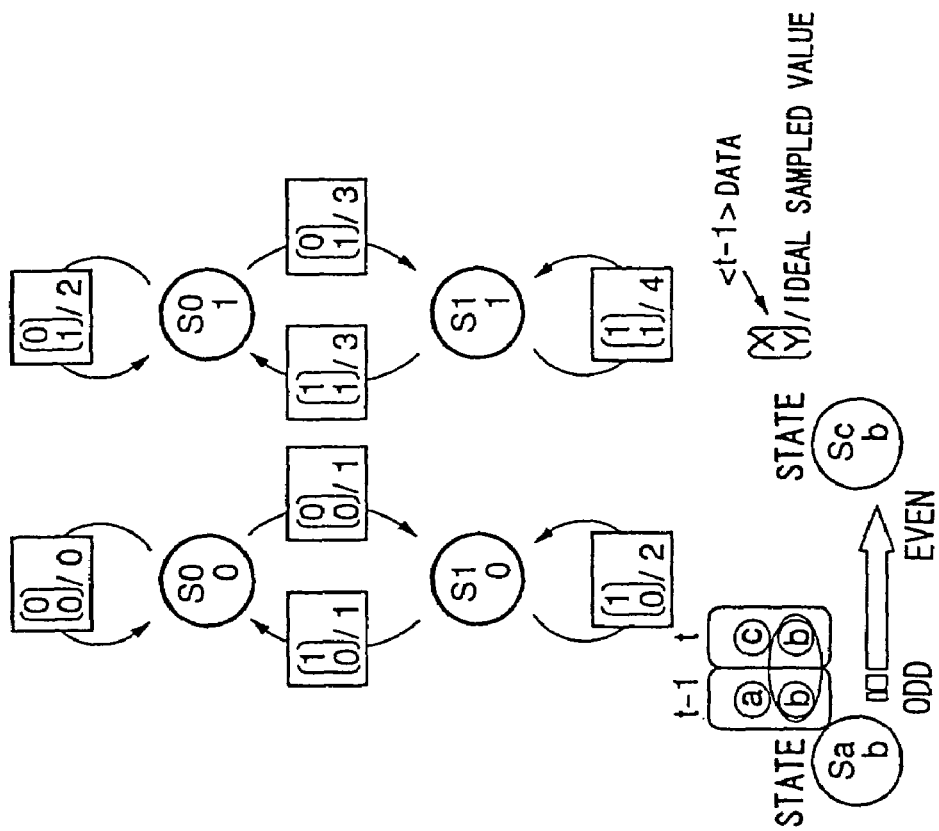
FIG. 10A shows states and transitions thereof (clock pulse from even to odd) in interfered four marks.
Figure 10B:
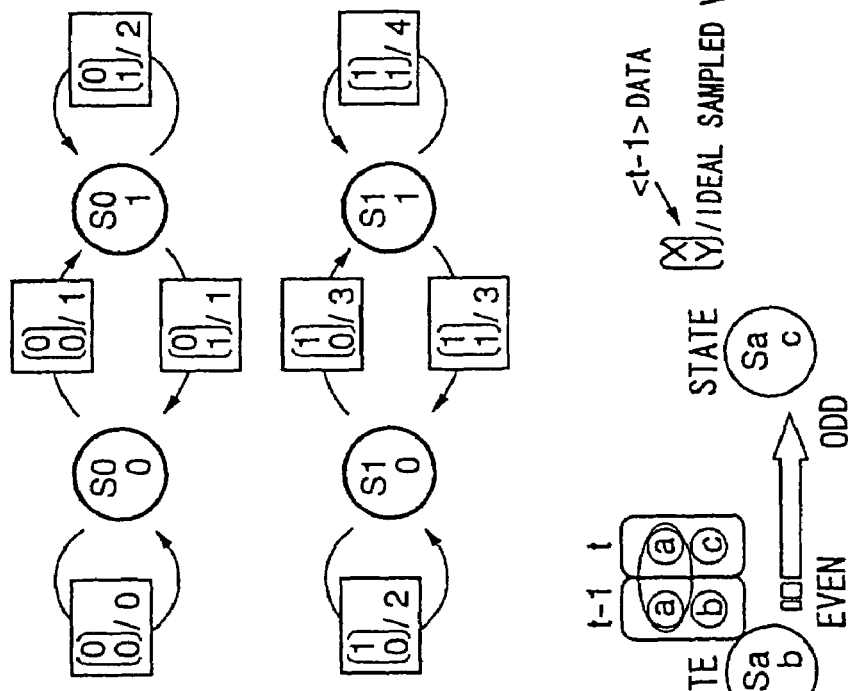
FIG. 10B shows states and transitions thereof (clock pulse from odd to even) in interfered four marks.
Figure 11:
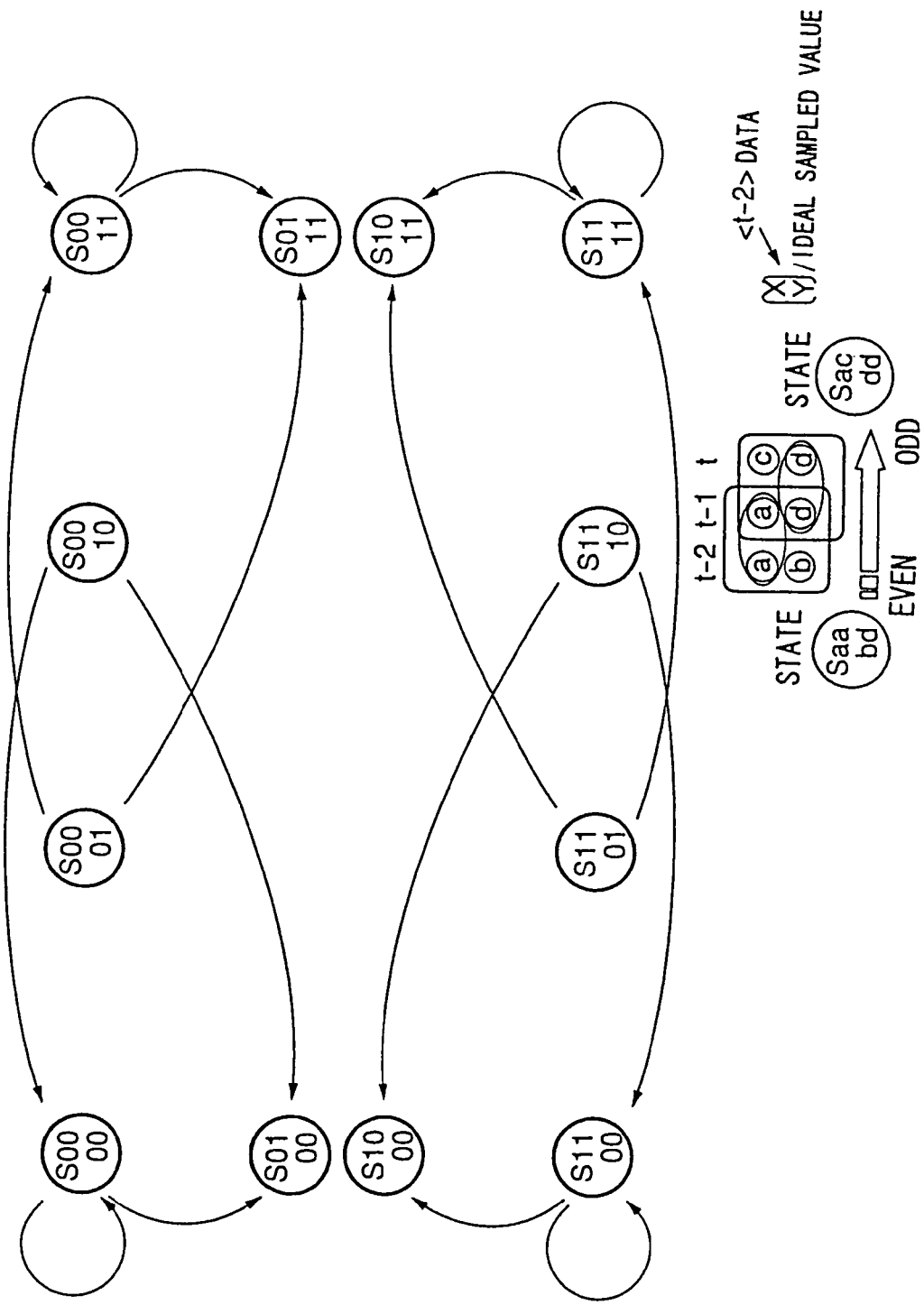
FIG. 11 shows states and transitions thereof (clock pulse from even to odd) in interfered six marks.
Figure 12:
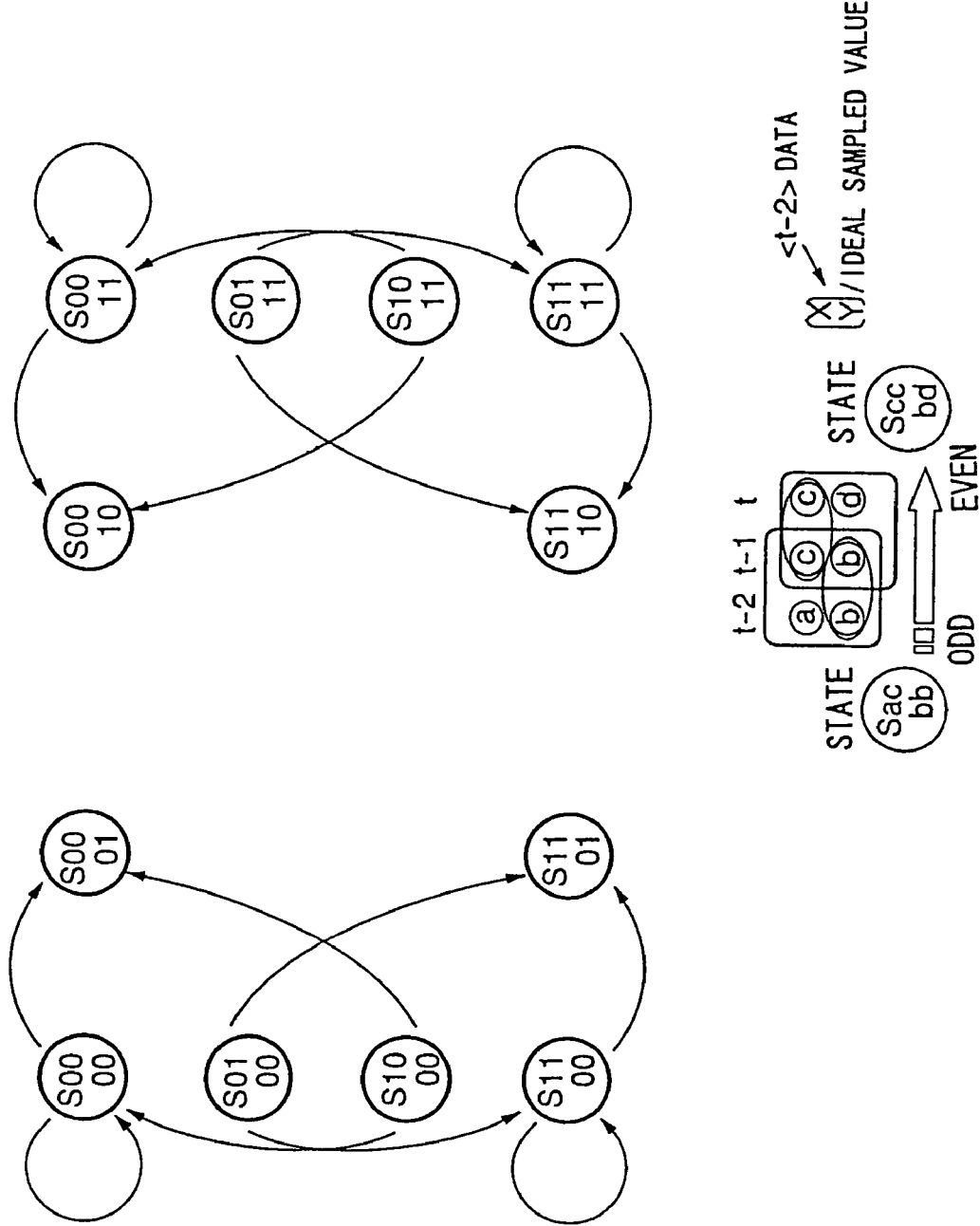
FIG. 12 shows states and transitions thereof (clock pulse from odd to even) in interfered six marks.
Figure 13:
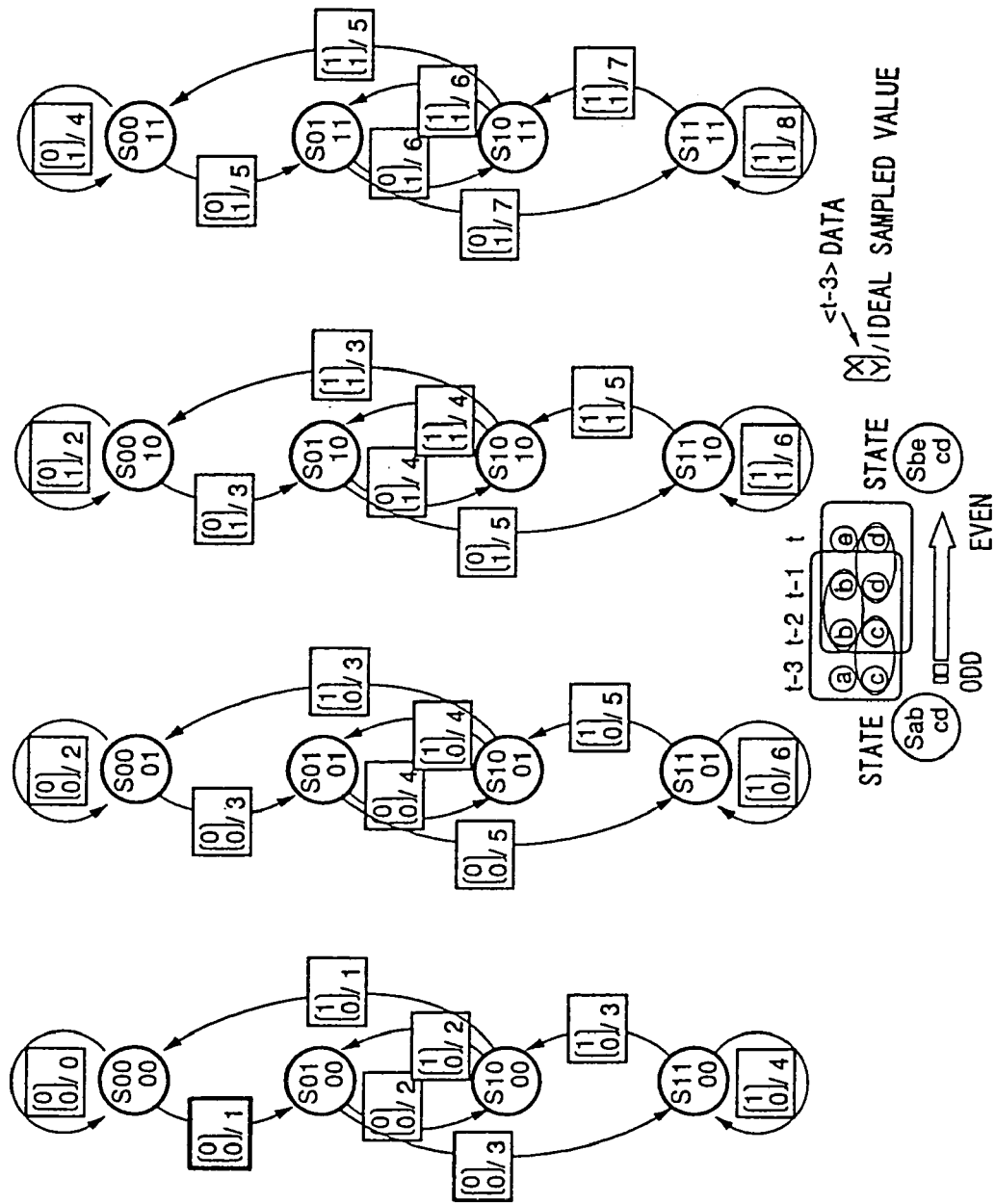
FIG. 13 shows states and transitions thereof (clock pulse from even to odd) in interfered eight marks.
Figure 14:
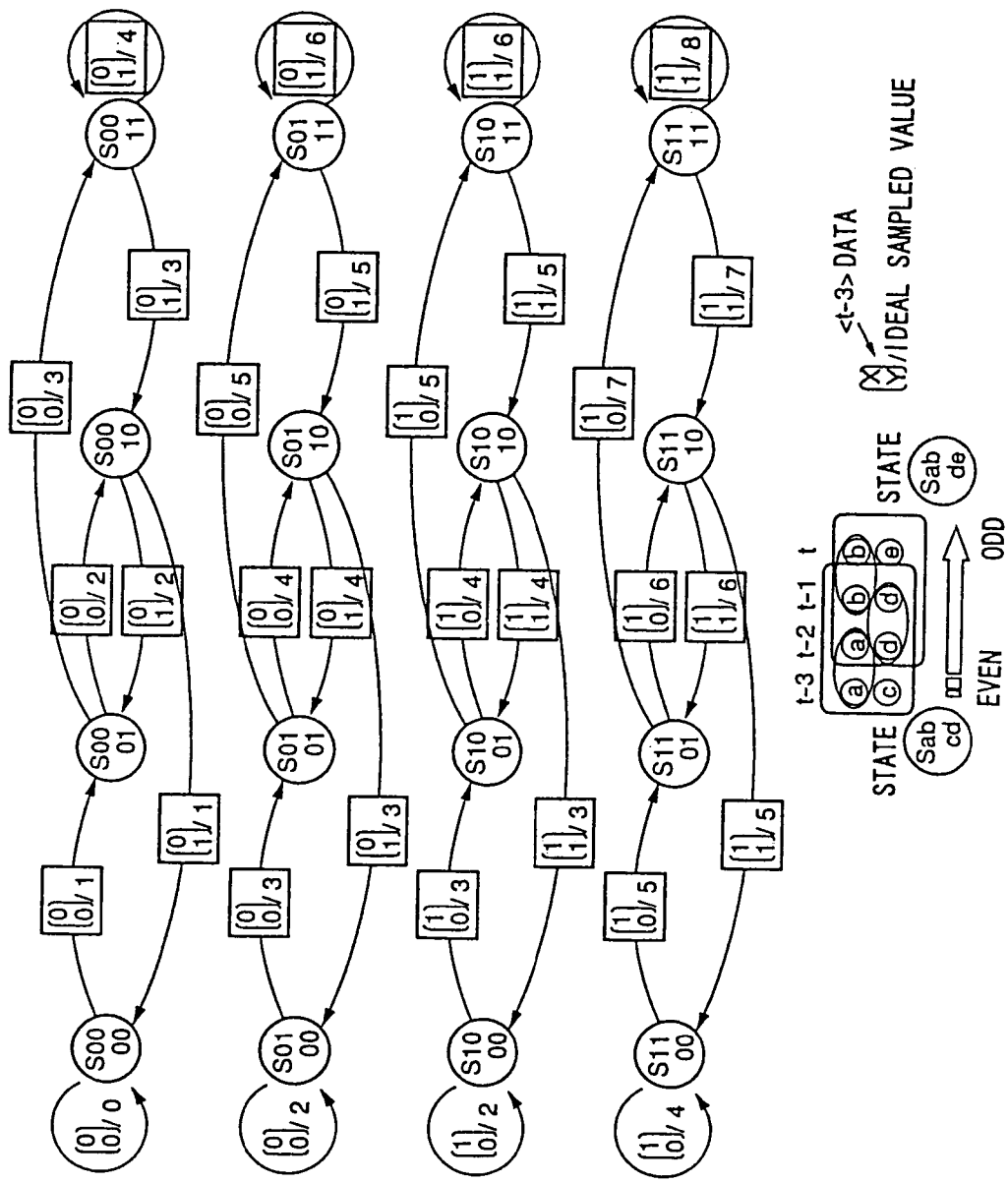
FIG. 14 shows states and transitions thereof (clock pulse from odd to even) in interfered eight marks.

FIG. 10A shows the states and state transitions (even clock pulse→odd clock pulse) in the interfered four marks. FIG. 10B shows the states and state transitions (odd clock pulse→even clock pulse) in the interfered four marks. FIG. 11 shows the states and state transitions (even clock pulse→odd clock pulse) in the interfered six marks. FIG. 12 shows the states and state transitions (odd clock pulse→even clock pulse) in the interfered six marks. FIG. 13 shows the states and state transitions (even clock pulse→odd clock pulse) in the interfered eight marks. FIG. 14 shows the states and state transitions (odd clock pulse→even clock pulse) in the interfered eight marks.

As shown in FIGS. 10A through 14, because the record marks are reproduced alternately according to the above-described double (twice) clock signal, the state transitions are different according to whether the odd clock pulse or even clock pulse is used for the reproduction at moments.

With reference to FIGS. 13 and 14, an example of demodulating the reproduced signal of the interfered eight marks will now be described. With regard to the interfered four marks and interfered six marks, demodulation can be performed by a similar manner.

Figure 15A:
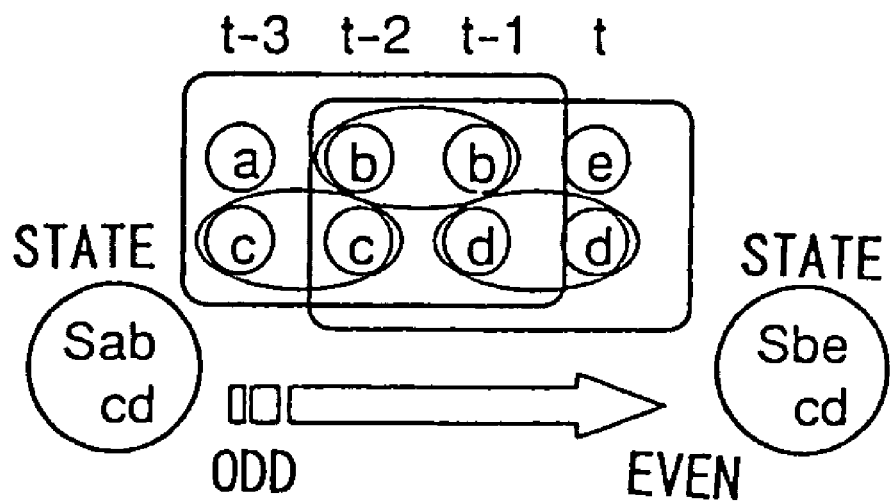
FIGS. 15A and 15B show examples showing states in interfered eight marks.
Figure 15B:
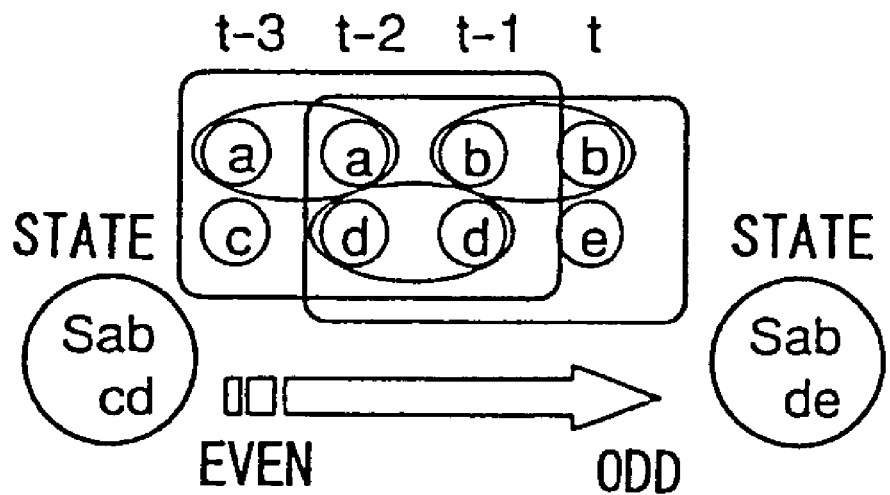

As shown in FIGS. 13 and 14, there are sixteen states of record marks, and can be represented by a 4×4 matrix $S_{ij}$. This matrix $S_{ij}$ represents the state of the times t−3, t−2, t−1 and the state of the times t−2, t−1, t where the states of record marks in the interfered eight marks are defined as those of the times t−3, t−2, t−1, t, as shown in FIGS. 15A and 15B.

The state transitions shown in FIGS. 13 and 14 are different according to whether the odd clock pulse or even clock pulse of the above-described double (twice) clock signal is used at the moments. For example, when the clock pulse used shifts from the odd clock pulse to the even clock pulse, the state transitions are transitions between rows of the matrix as shown in FIG. 13. There are 32 of those transitions, as shown in FIG. 13, and can be represented by a 4×8 matrix $T_{ij}$.

On the other hand, when the clock pulse used shifts from the even clock pulse to the odd clock pulse, the state transitions are transitions between columns of the matrix as shown in FIG. 14. There are 32 of those transitions, as shown in FIG. 14, and can be represented by a 8×4 matrix $T_{ij}$.

At this time, the data of the time t−3 is fixed by the transition. The thus-fixed data includes, in a case where the two rows A, B of record marks are recorded in one track, four types of data, i.e., (A, B)=(0, 0), (1, 0), (0, 1), (1, 1). These four types of data are defined as data 0, 1, 2, 3, in the stated order.

For example, in FIG. 13, in the leftmost column, the state transition (accented by a thick-line enclosure) from the top state to the second from the top state is described. In this transition, the data of the time t−3 is (0, 0) and the ideal sampled value is "1", as shown in the figure, the source (previous) state of (0, 0, 0, 0), as shown in the figure, means that the states (a, b, c, d) of record marks shown in FIG. 15A are (0, 0, 0, 0), and the destination (current) state of (0, 1, 0, 0), shown in FIG. 13, means that the states(b, e, c, d) of record marks shown in FIG. 15A are (0, 1,0, 0), as shown in the figure.

In details, the above-mentioned condition where (a, b, c, d) are (0, 0, 0, 0) of the previous state means the condition where the states of row A of the times (t−3, t−2, t−1) are (a, b, b) and (0, 0, 0), and the states of row B of the times (t−3, t−2, t−1) are (c, c, d) and (0, 0, 0), as shown in FIG. 15A. Similarly, the condition where (b, e, c, d) of the current state are (0, 1, 0, 0) means the condition where the states of row A of the times (t−2, t−1, t) are (b, b, e) and (0, 0, 1), and the states of row B of the times (t−2, t−1, t−0) are (c, d, d) and therefore (0, 0, 0), as shown in FIG. 15A.

In this example, (a, b, c, d, e) are (0, 0, 0, 0, 1). Accordingly, the entire eight states of the current state are (a, b, b, e) in row A and (c, c, d, d) in row B, and, therefore, the ideal sampled value is (a+b+b+e)+(c+c+d+d)=(0+0+0+1)+(0+0+0+0)=1. Further, the data of the time t−3 is (a, c) and therefore (0, 0).

Therefore, in the transition in this example, the previous state is of (a, b, c, d)=(0, 0, 0, 0), and, therefore, the data of the time t−3 is (a, b)=(0, 0), and the current state is of (b, e, d, d)=(0, 1, 0, 0), and, therefore, the ideal sampled value is (a+b+b+e)+(c+c+d+d)=(0+0+0+1)+(0+0+0+0)=1.

Figure 16:
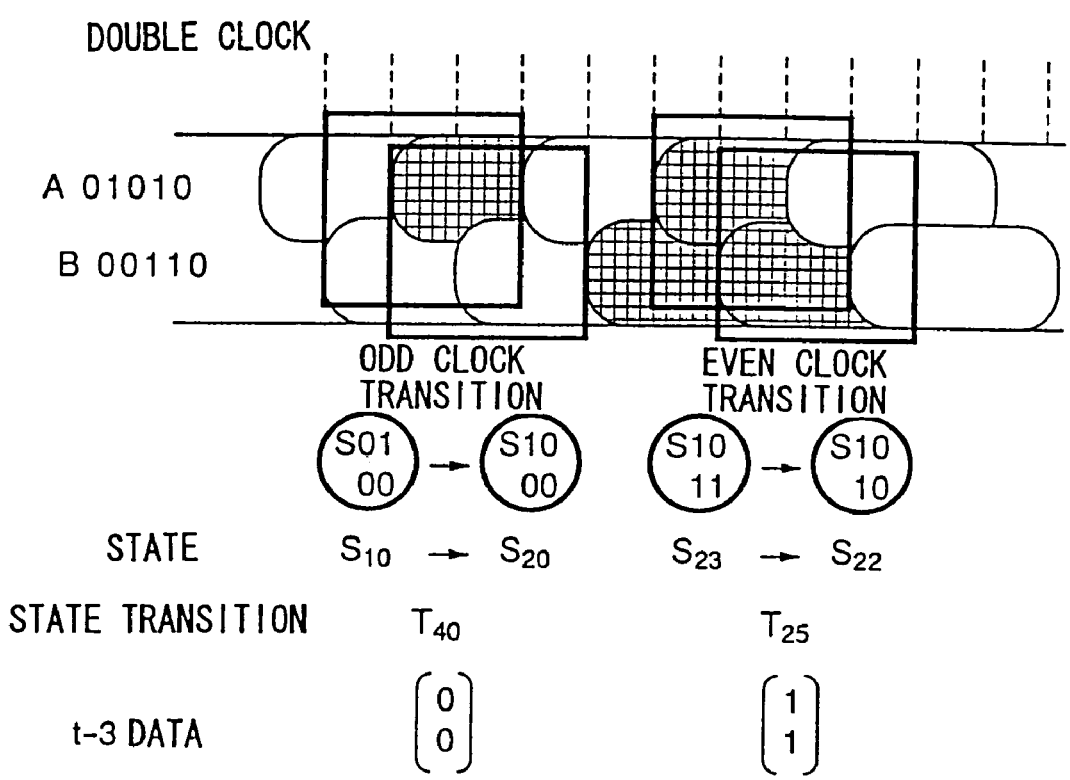
FIG. 16 shows an example of relationship between states, state transitions and record marks.

FIG. 16 shows the above-described relationship of the states, state transitions, and record marks.

Further, in FIGS. 13 and 14, the expected values through interference at the time of the respective state transitions are indicated as ideal sampled values, and are expressed by a matrix Phij. The matrix Phij is, same as Tij, a 4×8 matrix when the above-described clock pulse used of the double clock signal shifts from the odd one to the even one, but a 8×4 matrix when the above-described clock pulse used of the double clock signal shifts from the even one to the odd one.

Under the above-described conditions, data is demodulated from the sampled value yt obtained through interference by the Viterbi detector 100 shown in FIG. 8. The sampled value yt is the sampled value of the reproduced signal provided to the BM 101.

The BM 101 calculates the branch metric value (BM value) corresponding to the difference between the sampled value yt and the ideal sampled value which is the expected value of each state transition, through the following equation (1):

$$BMij=(yt-Phij)^2 \text{ or } |yt-Phij| \quad (1)$$

The branch metric value Bij can be expressed, same as the ideal sampled value, by a 4×8 matrix when the clock pulse used of the above-described double clock signal shifts from the odd one to the even one, but by a 8×4 matrix when the clock pulse used of the above-described double clock signal shifts from the even one to the odd one.

The ACS 102 calculates the pass-metric value PMij by adding the BMij, and performs comparison and selection for the minimum pass-metric value PMij.

It is noted that the pass-metric value PMij is the sum of the branch metric values BMij in the paths through which transitions to the state Sij are made According to Viterbi decoding, the path having the minimum pass-metric value PMij is determined as most probable.

Accordingly, PMij is defined using the following equations (2) and (3):

When clock pulse shifts from odd to even (only transition between columns)

$$PMij(t)=\min[PMik(t-1)+BMim(t), PMil(t-1)+BMin(t)] \quad (2)$$

where k=2mod(j,2), l=2mod(j,2)+1, m=2j, n=2j+1.

When clock pulse shifts from even to odd (only transition between rows)

$$PMij(t)=\min[PMkj(t-1)+BMmj(t), PMlj(t-1)+BMnj(t)] \quad (3)$$

where k 2mod(i,2), l=2mod(i,2)+1, m=2i, n=2i+1.

Using the above equation (2) or (3), the pass-metric value PMij is calculated, and is stored in the pass-metric memory 103. Then, the thus-stored pass-metric value PMij(t) is used, and the pass-metric value PMij(t+1) is calculated using the equation (2) or (3).

Further, according to the path selected when the minimum comparison is performed in the ACS unit 102, data is output to the pass memory 104. In other words, one data 0, 1, 2 or 3 is selected for one state, and, thus, 4×4 matrix data Dij is output to the pass memory 104.

Selection rules of output data according to selected path can be expressed, according to FIGS. 13 and 14, by the following tables 1 and 2:

TABLE 1

At the time of shift of clock pulse from odd to even:

| i | Former Item Selection | Latter Item Selection |
|---|---|---|
| 0 | 0 | 2 |
| 1 | 0 | 2 |
| 2 | 1 | 3 |
| 3 | 1 | 3 |

TABLE 2

At the time of shift of clock pulse from even to odd:

| i | Former Item Selection | Latter Item Selection |
|---|---|---|
| 0 | 0 | 1 |
| 1 | 0 | 1 |
| 2 | 2 | 3 |
| 3 | 2 | 3 |

The pass memory 104 is designed to includes a plurality of stages of shift registers, and, has a configuration of a matrix SRij in memory system expressed by a 4×4 matrix same as that of the state Sij. The pass memory 104 receives the data Dij according to the selected path from the ACS unit 102, and shift registers in each stage of the pass memory 104 have data provided thereto from the shift registers corresponding to the preceding clock pulse. The data to be thus provided is defined, according to FIGS. 13 and 14, by the following equations (4) and (5):

At the time of shift of clock pulse from odd to even (only transitions between columns):

$SRij(t)=SRik(t-1)$ when $Dij=0$ or 1;

$SRij(t)=SRil(t-1)$ when $Dij=2$ or 3     (4)

where:
- $k=0$, $l=2$, when $j=0$ or 1;
- $k=1$, $l=3$, when $j=2$ or 3.

At the time of shift of clock pulse from even to odd (only transitions between rows):

$SRij(t)=SRkj(t-1)$ when $Dij=0$ or 2;

$SRij(t)=SRlj(t-1)$ when $Dij=1$ or 3     (5)

where:
- $k=0$, $l=2$, when $i=0$ or 1;
- $k=1$, $l=3$, when $i=2$ or 3.

According to the rules indicated by the equations (4) and (5), the shift registers have the data provided thereto from the shift registers corresponding to the preceding clock pulse in sequence, and, all the data coincide with each other through the sufficient number of stages of shift registers.

That is, the data $Dij$ of the shift registers of the matrix $SRij$, subsequent to a certain number of stages thereof, has the same data of any of (0, 1, 2, 3) in all the elements thereof. Accordingly, it is possible to demodulate the data of the rows A, B of record marks recorded in one track under use of the double (twice) clock signal.

It is noted that, even in a case where the number of rows of record marks recorded in one track is increased, the data can be demodulated through a similar process as a result of a matrix of m-dimensions being used for representing the states, the number of which is increased accordingly.

It is noted that a basic principle of the above-described Viterbi decoding (demodulating) method is well-known (for example, see 'DATA REPRODUCTION SYSTEM', Continuation Application under 35 U.S.C. 111(a) of International Patent Application No. PCT/JP99/01273, filed on Mar. 16, 1999 by the present applicant).

In the above-described method in which a plurality of rows of record marks are recorded in one track and reproduction is made therefrom, because laser light has a superior coherent property, when a plurality of laser light beams are caused to approach one another, beat occurs due to interference therebetween. As a result, the intensity of the laser light changes periodically.

Further, in a case where a single laser light beam is used for reproducing from a plurality of rows of record marks recorded, cross talk occurs between a signal of a desired row of record marks and a signal of another row of record marks recorded in the same track together. As a result, it becomes difficult to separate the signal of the other row of record marks recorded in the same track together from the signal of the desired row of record marks.

Figure 17:
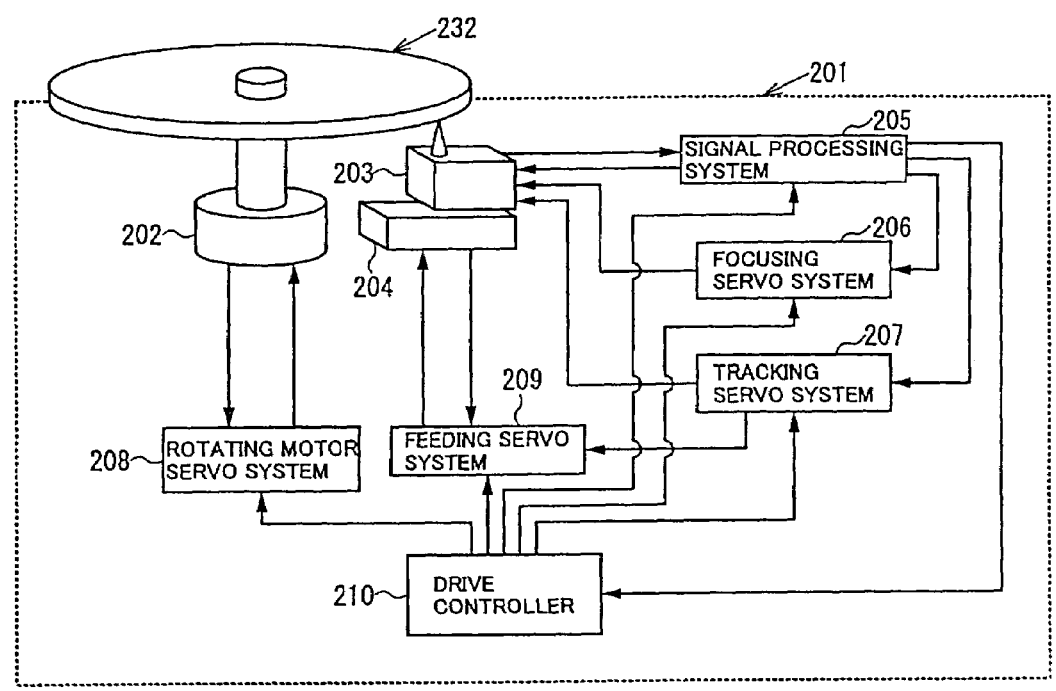
FIG. 17 shows a block diagram roughly showing an example of configuration of an opitcal disk drive in a second embodiment of the present invention.

FIG. 17 shows an optical disk drive in a second embodiment of the present invention which has been devised in consideration of the above-described points.

The optical disk drive 201 shown in FIG. 17 includes a focusing servo system 206, a tracking servo system 207 and a feeding servo system 209 which control laser light to a desired position on an optical disk 232, a motor 202 which rotates the optical disk 232, a rotating motor servo system 208 which controls a rotation speed of the optical disk 232, an optical system 203 which applies the laser light to the optical disk 232 and outputs the reflected light as a reproduced signal, a feeding motor 204 which moves the optical system 203, a signal processing system 205 which receives the reproduce signal and performs signal processing on the signal, and a drive controller 210 which controls operations of the respective systems.

In FIG. 17, the focusing servo system 206 controls the optical system 203 so that the focus position of the laser light is always located on the recording surface of the optical disk 232. The tracking servo system 207 controls the optical system 203 so that the laser light follows a track of the optical disk 232. The feeding servo system 209 controls the feeding motor 204 so that the laser light moves to a desired track of the optical disk 232 at high speed.

Through the optical disk drive 201, it is possible to record a plurality of rows of record marks in one track of the optical disk 232 by controlling the tracking servo system 207 for example.

Figure 18:
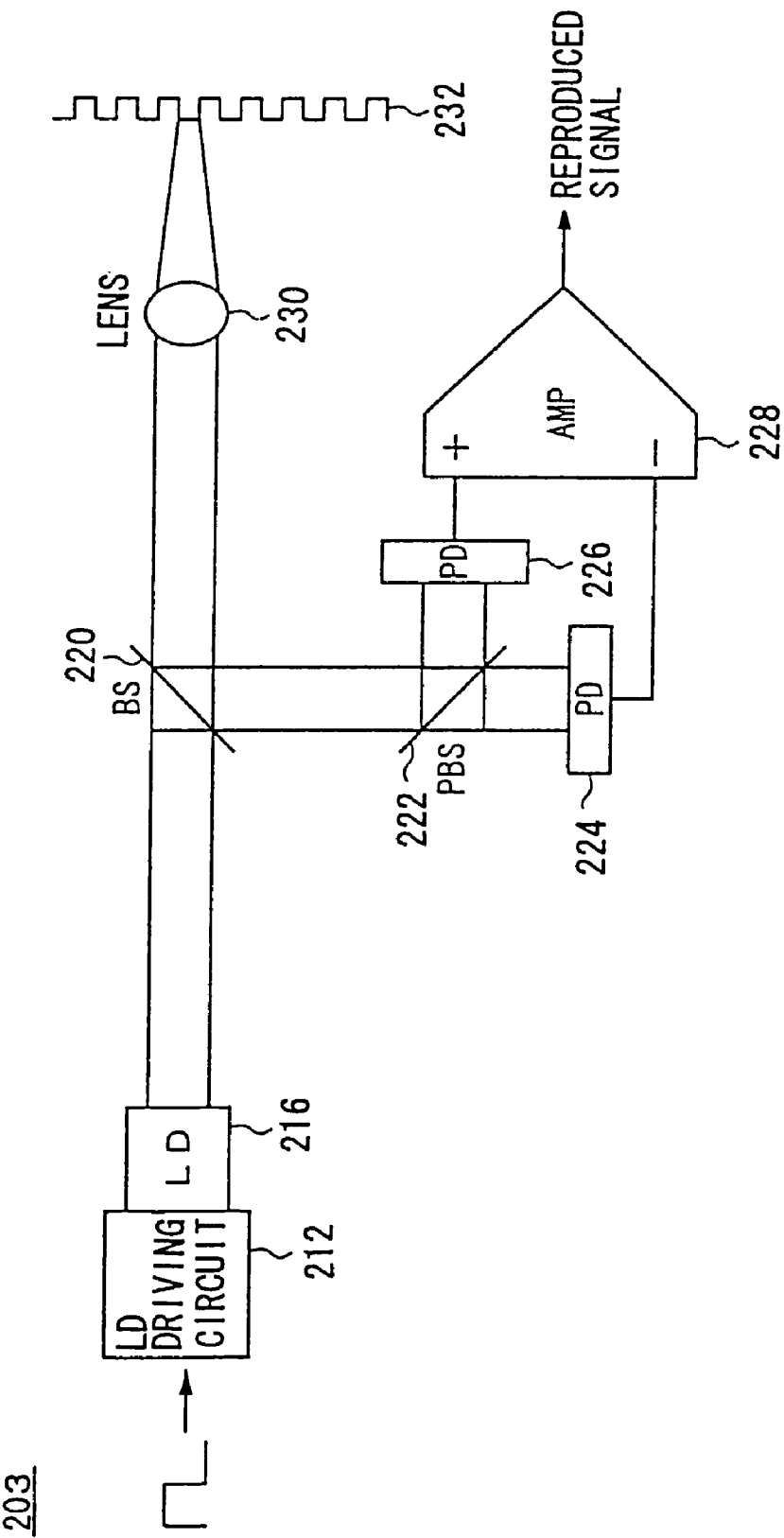
FIG. 18 shows a block diagram showing an example of configuration of an optical system shown in FIG. 17.

FIG. 18 shows an example of configuration of the optical system 203 shown in FIG. 17.

Figure 19A:
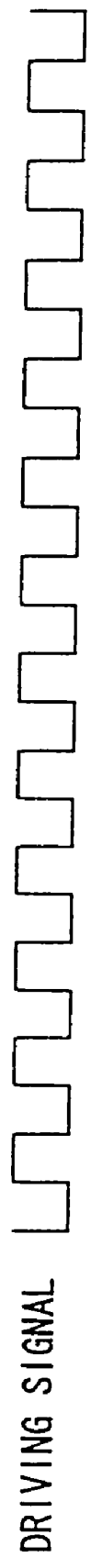
FIGS. 19A and 19B show timing charts showing signal strings controlling data recording of the optical disk drive shown in FIG. 17.

In FIG. 18, an LD (Laser Diode) driving circuit 212, at a time of data recording, has a pulse-like driving signal shown in FIG. 19A provided thereto for example. The LD driving circuit 212 causes an LD 216, connected thereto, to emit light.

The laser light emitted by the LD 216 is incident on the optical disk 232 after being transmitted by a beam splitter (BS) 220 and passing through a lens 230.

The lens 230 is controlled in a focusing direction and in a tracking direction by a lens actuator not shown in the figure. The lens actuator is controlled by the focusing servo system 206 and tracking servo system 207, and controls the lens 230 in the focusing direction and in the tracking direction. As a result, the lens 230 condenses the incident laser light so as to cause it to focus on the surface of the optical disk 232, and forms a beam spot in a desired track of the optical disk 232.

Through the optical disk drive 201, it is possible to record a plurality of rows of record marks in one track of the optical disk 232 by controlling the lens actuator by the tracking servo system 207 and controlling the lens 230 in the tracking direction.

Figure 19B:

In a case where the optical disk 232 is a magneto-optical disk, the optical disk drive 201 is configured to include a magnetic head which has a magnetic-field signal shown in FIG. 19B provided thereto, and generates a magnetic field on the surface of the optical disk 232.

An optical disk recording method using the above-described optical disk drive 201 will now be described.

Figure 20A:
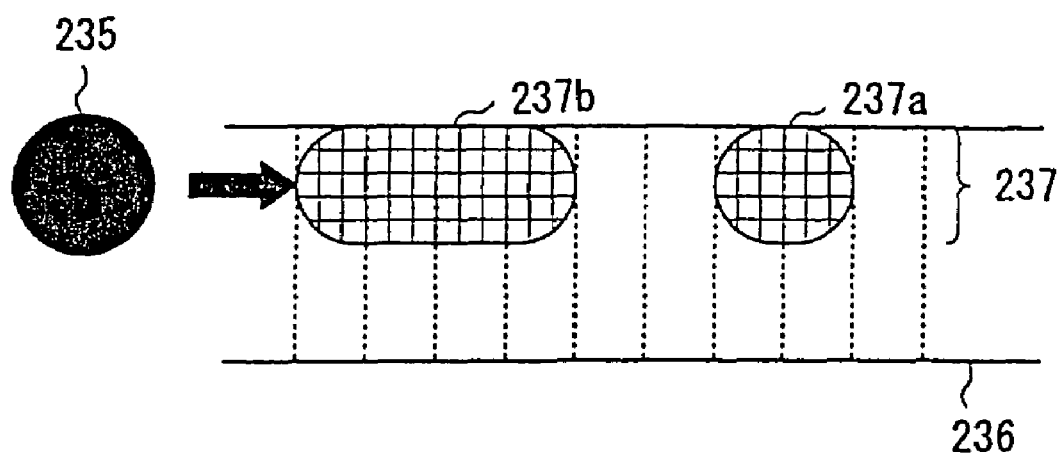
FIGS. 20A and 20B show an optical disk recording method of the optical disk drive shown in FIG. 17.
Figure 20B:
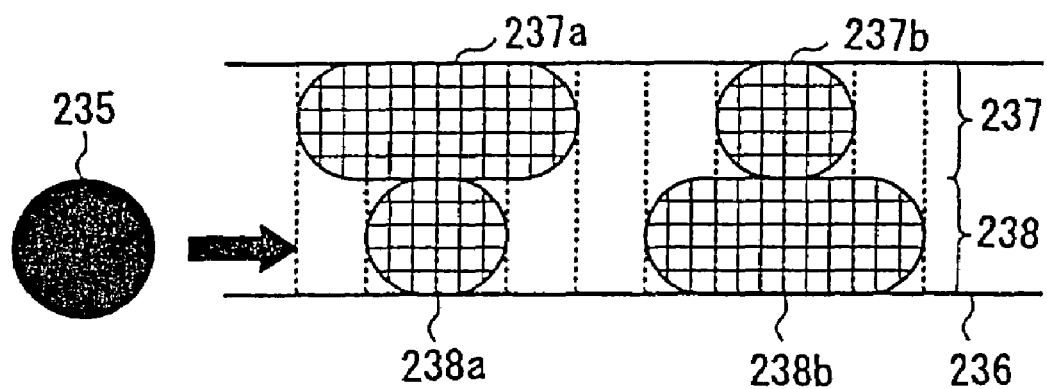

FIGS. 20A and 20B illustrate the optical disk recording method. In the example shown in FIGS. 20A and 20B, two rows of record marks are recorded in one track.

The recording method may be according to any one of optical modulation, magnetic-field modulation, and so forth.

First, as shown in FIG. 20A, the lens 230 is controlled in the tracking direction so that the beam spot 235 follows an upper half, in the figure, of one track 236 of the optical disk 232.

The beam spot 235 is incident in the upper half of the track 236 successively as the optical disk 232 rotates, and records a row 237 of record marks including record marks 237a and 237b.

For example, the row 237 of record marks are recorded in sequence rightward from the left-end record mark 237a.

When the optical disk 232 has made one revolution and recording in the upper half of the track 236 has been finished through one circle thereof, recording of another row of record marks is performed in the lower half of the track 236 through one circle thereof in a subsequent revolution or a later revolution.

As shown in FIG. 20B, the lens 230 is controlled in the tracking direction so that the beam spot 235 follows the lower half, in the figure, of the track 236 of the optical disk 232.

The beam spot 235 is incident in the lower half of the track 236 successively as the optical disk 232 rotates, and records the row 238 of record marks including record marks 238a and 238b.

For example, the row 238 of record marks are recorded in sequence rightward from the left-end record mark 238a.

As shown in FIG. 20B, the row 237 of record marks and row 238 of record marks recorded in one track 236 are different in phase by ½ period.

Although FIGS. 20A and 20B illustrate the example where the two rows 237 and 278 of record marks are recorded in one track 236, it is also possible to record three or more rows of record marks in one track in a similar method.

Reproduction from the record marks recorded in one track as shown in FIG. 20B will now be described with reference to FIG. 18.

In FIG. 18, the LD driving circuit 212, when reproducing data, has a pulse-like driving signal provided thereto for causing the LD 216 to emit light in synchronization with the record marks.

For example, when having the pulse-like driving signal provided thereto for causing the LD 216 to emit light in synchronization with the record marks, the LD driving circuit 212 causes the LD 216, connected thereto, to emit light in synchronization with the record marks.

The laser light emitted by the LD 216 is transmitted by the beam splitter 220, and is incident on the optical disk 232 through the lens 230. The lens 230 condenses the provided, laser light so as to cause it to focus on the surface of the optical disk 232, and forms a beam spot in a desired track of the optical disk 232.

In the optical disk drive 201, the lens actuator is controlled by the tracking servo system 207, for example, and, thus, the lens 230 is controlled in the tracking direction so that the beam spot follows the center of one track of the optical disk 232

Figure 21:
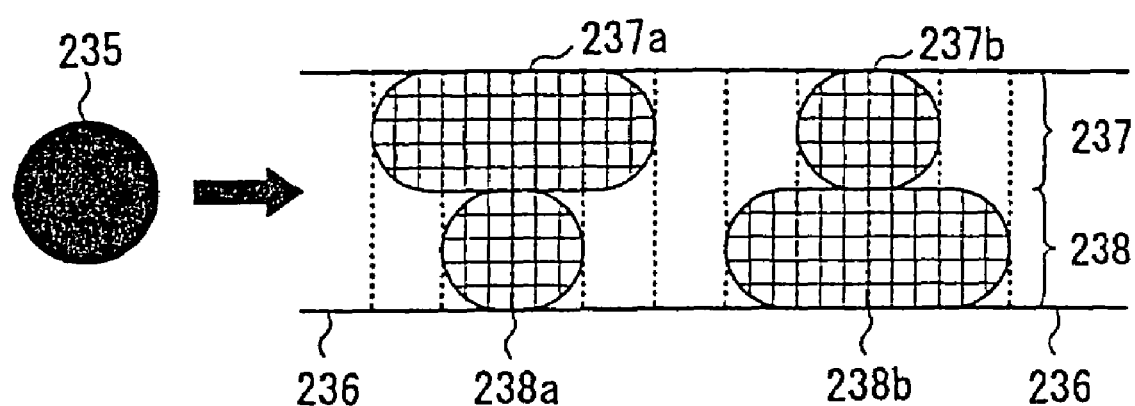
FIG. 21 shows an optical disk reproducing method of the optical disk drive shown in FIG. 17.

FIG. 21 illustrates an optical disk reproducing method using the optical disk drive 201.

The example shown in FIG. 21 is one example in which reproduction is performed from two rows of record marks recorded in one track of the optical disk 232.

As shown in FIG. 21, the lens 230 is controlled in the tracking direction so that a beam spot 235 follows the center of one track 236 of the optical disk 232.

The beam spot 235 is incident at the center of the track 236 successively as the optical disk 232 rotates, and causes reflected light to be generated from the rows 237, 238 of record marks simultaneously. That is, a reproduced signal obtained through the beam spot 235 is one obtained from mixing reproduced signals from the rows 237, 238 of record marks.

In FIG. 18, when the reflected light from the optical disk 232 passes through the lens 230, it is reflected by the beam splitter 220, and is incident on a beam splitter 222. The reflected light incident on the beam splitter 222 is split according to a polarization component thereby, and is provided to a photodiode (PD) 224 or 226.

The photodiode 224 or 226 converts the provided light signal into an electric signal, and outputs the electric signal to an amplifier 228. The amplifier 228 amplifies the electric signal provided by the photodiode 224 or 226, and outputs a reproduced signal.

Figure 22A:
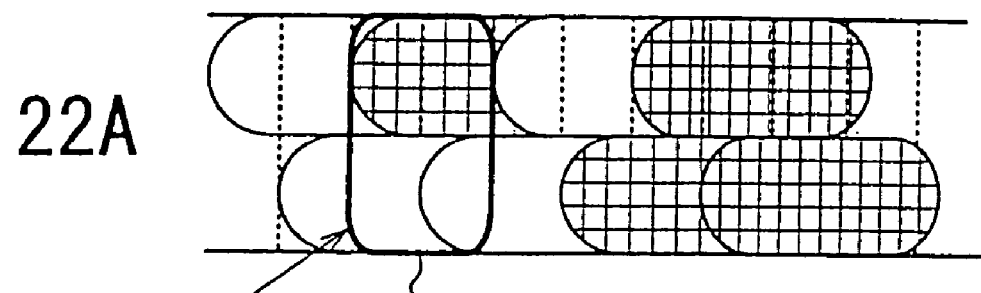
FIGS. 22A, 22B and 22C show examples showing relationships between record marks and beam spots in the optical disk drive shown in FIG. 17.
Figure 22B:
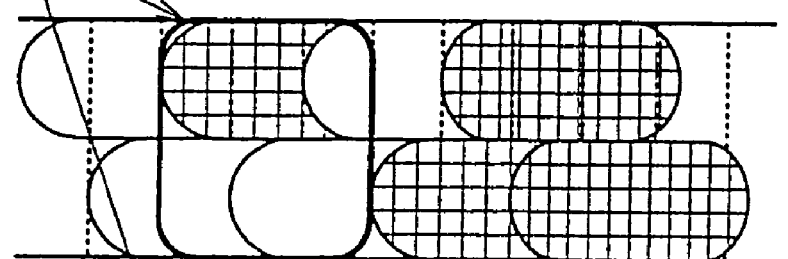
Figure 22C:
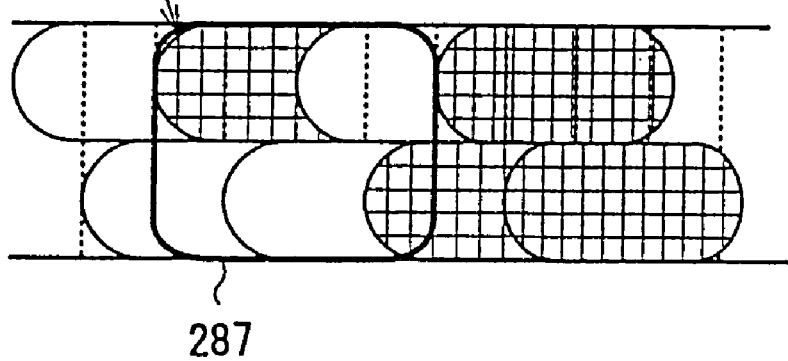

FIGS. 22A, 22B and 22C show examples illustrating relationships between beam spots and record marks.

In FIGS. 22A, 22B and 22C, beam spots 285, 286 and 287 have different sizes because the sizes of record marks are shown as being equal. However, actually, the beam spots 285, 286 and 287 are same in size.

FIG. 22A shows an example of a case (referred to as interfered four marks, hereinafter) in which four states of record marks are included in an area of the beam spot 285. Accordingly, the reproduced signal obtained by means of the beam spot 85 is a signal mixed from reproduced signals from the four states of record marks.

FIG. 22B shows an example of a case (referred to as interfered six marks, hereinafter) in which six states of record marks are included in an area of the beam spot 286. Accordingly, the reproduced signal obtained by means of the beam spot 86 is a signal mixed from reproduced signals from the six states of record marks.

FIG. 22C shows an example of a case (referred to as interfered eight marks, hereinafter) in which eight states of record marks are included in an area of the beam spot 87. Accordingly, the reproduced signal obtained by means of the beam spot 287 is a signal mixed from reproduced signals from the eight states of record marks.

Thus, the reproduced signal output from the amplifier 228 is a signal mixed from reproduced signals from a plurality of states of record marks included in the area of the beam spot. In other words, it is possible to demodulate the reproduced signal output from the amplifier 228 into the original data, similarly to a case of a reproduced signal from an opitcal disk to which data is recorded after being modulated into a partial response (PR) waveform.

For example, it is possible to detect the most probable data using a Viterbi detector after sampling at a predetermined frequency from a reproduced signal from an optical disk to which data is recorded after being modulated into a PR waveform.

An example of a configuration of a data reproducing system for demodulating such a reproduced signal is shown in FIG. 8.

The configuration and operations of the system shown in FIG. 8 have been described above, and duplicated description will be omitted.

As a specific example, a procedure of reproducing the interfered four marks shown in FIG. 22A will now be described.

FIGS. 23A through 23F show one example of relationship between the record marks and clock signals.

FIG. 23A shows a clock signal corresponding to the row A of record marks recorded on the optical disk. The period of the clock signal corresponds to the size of the record mark. FIG. 23B shows the row A of record marks recorded on the optical disk.

FIG. 23C shows a clock signal corresponding to the row B of record marks recorded on the optical disk. The period of the clock signal corresponds to the size of the record mark. FIG. 23D shows the row B of record marks recorded on the optical disk.

As shown in FIGS. 23A and 23C, the rows A and B of record marks recorded in one track are different in phase by ½ period When it is assumed that a clock signal (double clock signal) twice in frequency the clock signals shown in FIGS. 23A and 23C is a reference, the reproduced signal is obtained twice from one record mark.

For example, through the area 141 enclosed by the broken line shown in FIG. 23B, one state is obtained from one record mark when the clock signal shown in FIG. 23A is used as a reference. However, through the same area 141, two states are obtained from one record mark when the clock signal shown in FIG. 23E is used as a reference.

Because FIGS. 23A through 23E show the example of interfered four marks, each beam spot includes four states of record marks.

This condition is shown in FIG. 23F.

For example, the area 143a enclosed by the broken line shown in FIG. 23B and the area 143B enclosed by the broken line shown in FIG. 23D correspond to the area of the beam spot, and includes four states of record marks. Accordingly, the reproduced signal output from the amplifier 228 is shown in FIG. 23F which is a mix (sum) of the states shown in FIGS. 23B and 23D.

It is noted that the area 143a includes one record mark of upper half as shown in FIG. 22A having the state of "1" for two clock pulses of the double clock signal and corresponds to the reproduced signal value of "2", while the area 143b includes respective portions of two record marks of lower half as shown in FIG. 22A having the states of "1" and "0" each for one clock pulse of the double clock signal, respectively, and corresponds to the reproduced signal value of "1". The reason why the area 143a corresponds to the value "2" is that the area of the record mark enclosed by the area 143a is twice the area of each of respective portions of the record marks enclosed by the area 143b, as shown in FIG. 22A.

The reproduced signal output from the amplifier 228 has different states of record marks for the interfered four marks, interfered six marks and interfered eight marks. The states of record marks different for the interfered four marks, interfered six marks and interfered eight marks, and conditions of state transitions are shown in FIGS. 10A through 14, description thereof having been made, and duplicated description thereof being omitted.

Further, an example of reproduction of interfered eight marks has been described with reference to FIGS. 13 and 14, and duplicated description thereof will be omitted.

As described above, with regard to the interfered four marks and interfered six marks, demodulation can be performed by a similar manner.

Further, it is noted that, even in a case where the number of rows of record marks recorded in one track is increased, the data can be demodulated through a similar process as a result of a matrix of m-dimensions being used for representing the states, the number of which is increased accordingly.

The present invention is not limited to the above-described embodiments, and variations and modifications may be made without departing from the scope of the present invention.

The present application is based on Japanese priority application No. 11-345499, filed on Dec. 3, 1999, the entire contents of which are hereby incorporated by reference.

What is claimed is:

1. An optical recording medium on which data is recorded as a result of laser light being incident in a recording track and a magnetic field being generated therein,
   wherein a first row of record marks is recorded in each track in such a manner that said record marks of said first row partially overlap one another along a direction parallel to said track,
   wherein a second row of record marks is recorded in each track in such a manner that said record marks of said second row partially overlap one another along a direction parallel to said track, and
   wherein said first row of record marks partially overlaps said second row of record marks.

2. The optical recording medium as claimed in claim 1 comprising a magneto-optical disk.

3. An optical recording medium having laser light applied to and a magnetic field generated to a recording track so as to have data recorded thereto, wherein a first row of record marks is formed in each track in such a manner that said record marks of said first row partially overlap one another along a direction parallel to said track, and
   wherein a second row of record marks is formed in each track in such a manner that said record marks of said second row partially overlap one another along a direction parallel to said track, and
   wherein said first row of record marks partially overlaps said second row of record marks.

* * * * *